United States Patent
Aymar

(10) Patent No.: US 12,472,793 B2
(45) Date of Patent: Nov. 18, 2025

(54) ADJUSTABLE BYPASS SHOCK ABSORBER

(71) Applicant: Brandon P. Aymar, Santee, CA (US)

(72) Inventor: Brandon P. Aymar, Santee, CA (US)

(*) Notice: Subject to any disclaimer, the term of this patent is extended or adjusted under 35 U.S.C. 154(b) by 0 days.

(21) Appl. No.: 18/321,865

(22) Filed: May 23, 2023

(65) Prior Publication Data

US 2024/0391287 A1     Nov. 28, 2024

(51) Int. Cl.
*B60G 17/08* (2006.01)
*B60G 15/06* (2006.01)
*B60G 17/005* (2006.01)

(52) U.S. Cl.
CPC ............ *B60G 17/08* (2013.01); *B60G 15/067* (2013.01); *B60G 17/005* (2013.01); *B60G 15/063* (2013.01); *B60G 2202/312* (2013.01); *B60G 2204/128* (2013.01); *B60G 2204/61* (2013.01); *B60G 2206/41* (2013.01); *B60G 2206/80* (2013.01); *B60G 2500/11* (2013.01); *B60G 2600/20* (2013.01); *B60G 2800/162* (2013.01)

(58) Field of Classification Search
CPC .... B60G 17/08; B60G 15/067; B60G 17/005; B60G 15/063; B60G 2202/312; B60G 2204/128; B60G 2204/61; B60G 2206/41; B60G 2206/80; B60G 2500/11; B60G 2600/20; B60G 280/162; F16F 9/34; F16F 9/44; F16F 9/50; F16F 9/3285; F16F 9/346; F16F 9/348; F16F 9/3481; F16F 9/3484; F16F 9/486
See application file for complete search history.

(56) References Cited

U.S. PATENT DOCUMENTS

| | | | |
|---|---|---|---|
| 2020/0173513 A1* | 6/2020 | Woenarta | F16F 9/067 |
| 2023/0146639 A1* | 5/2023 | Kim | F16F 9/464 |
| | | | 188/266.2 |

\* cited by examiner

*Primary Examiner* — Jason D Shanske
*Assistant Examiner* — Scott Lawrence Strickler
(74) *Attorney, Agent, or Firm* — Richard D. Clarke

(57) ABSTRACT

The present application is directed to an externally adjustable internal bypass shock absorber that combines both the suspension function and the shock absorbing function in one unit. More particularly, the shock body houses a bypass cylinder that includes an upper bulkhead with adjuster rod pockets and check valves as well as a lower bulkhead having one or more check valves. The bypass cylinder includes one or more bypass tubes within bypass tube accepting cavities, in fluid communication with bypass adjuster valve blocks controlling the flow of hydraulic fluid within the bypass tubes. Adjuster rods are telescopically received inside the bypass adjuster block valves for controlling whether the individual oil flow ports are closed, partially open, or fully open. These adjuster rods provide an actuation means in the damper for manual or non-automatic adjustment allowing high speed and low speed as well as sway control on the external shock surface.

22 Claims, 23 Drawing Sheets

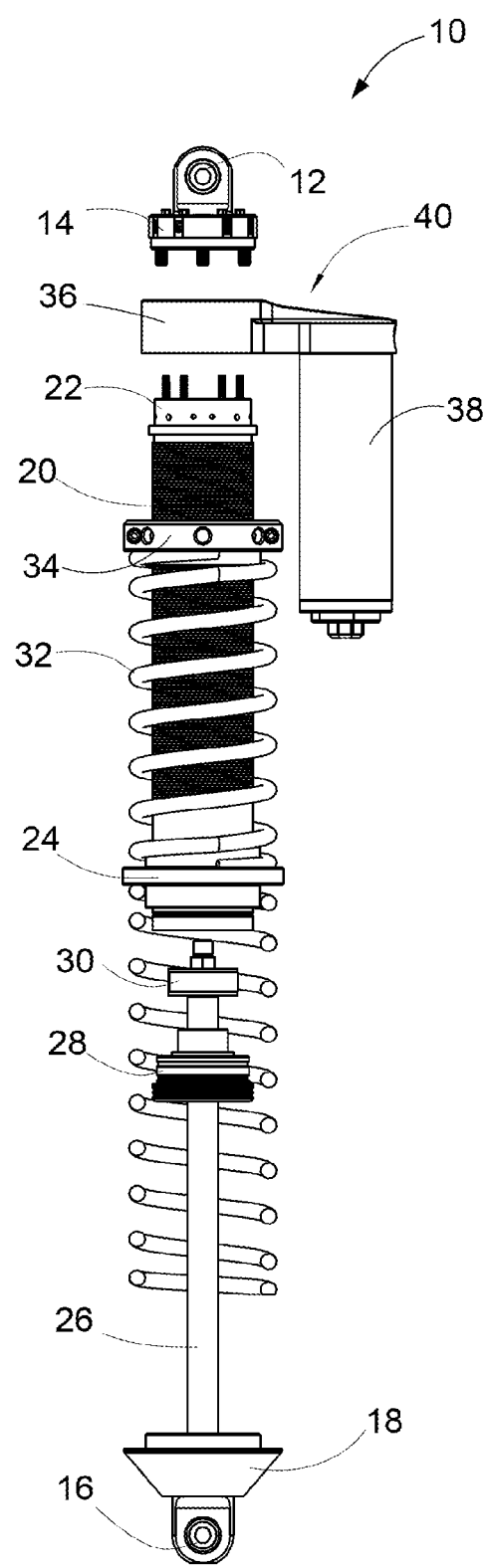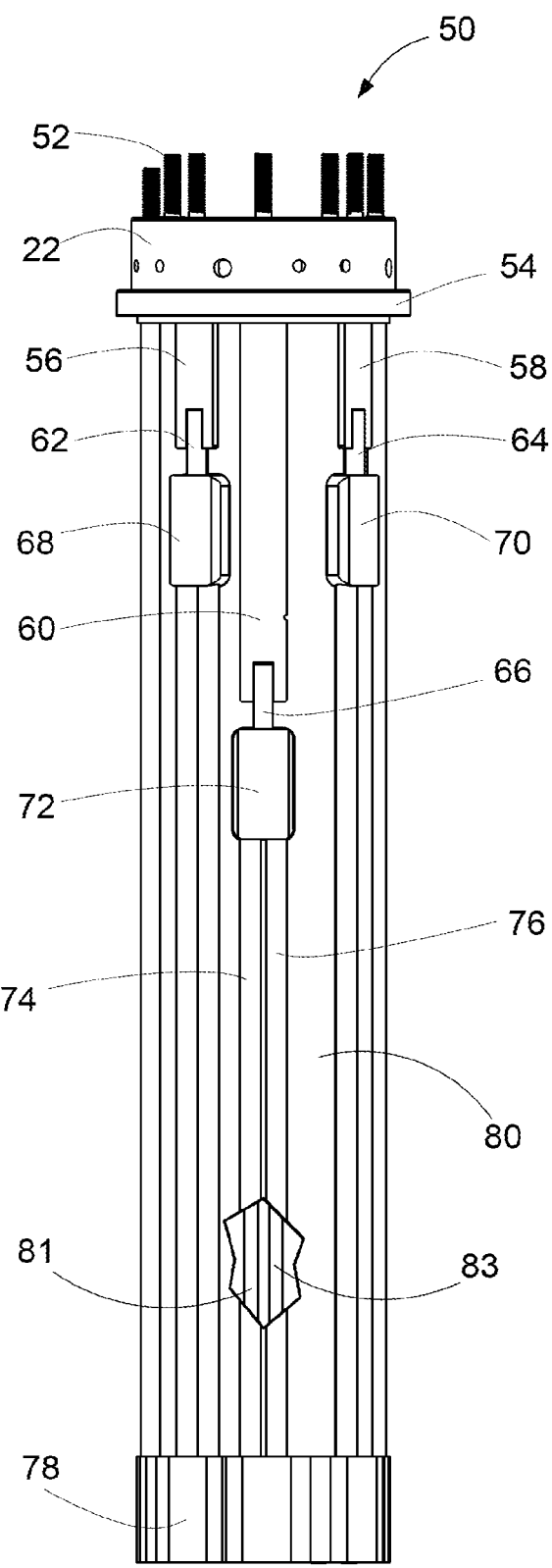
FIG. 3
FIG. 4

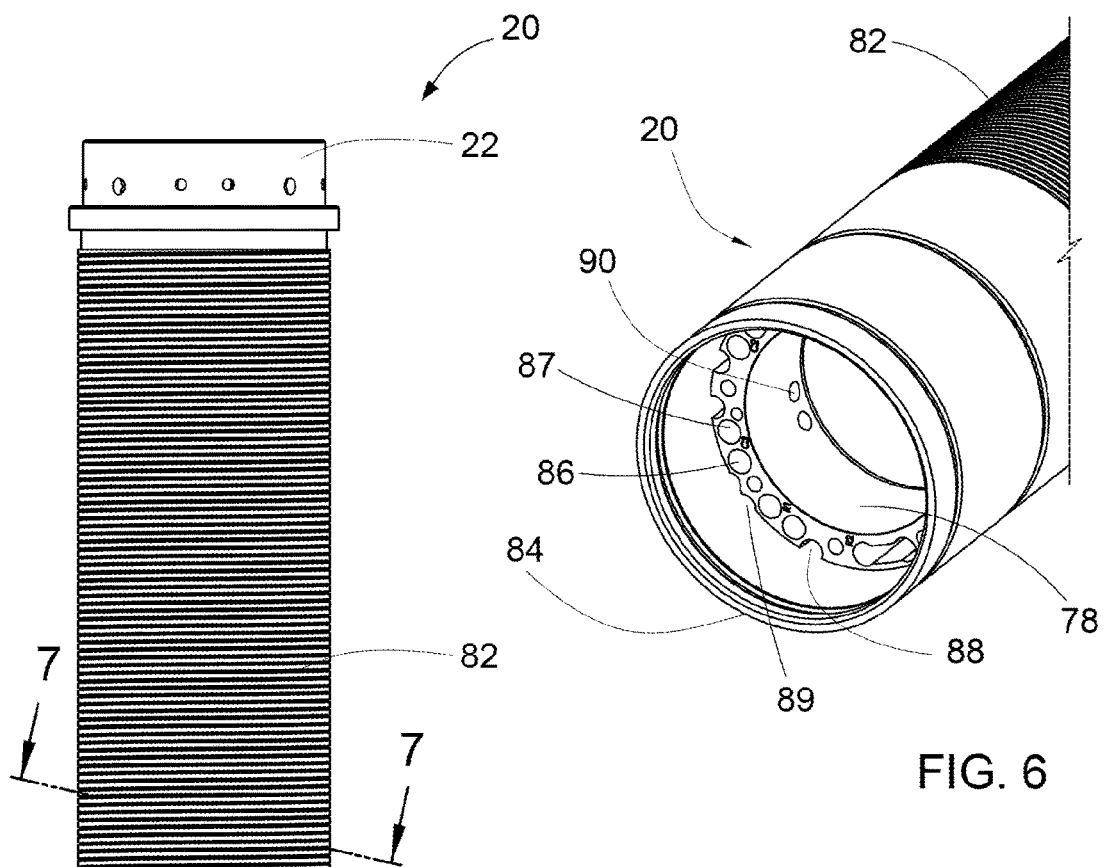
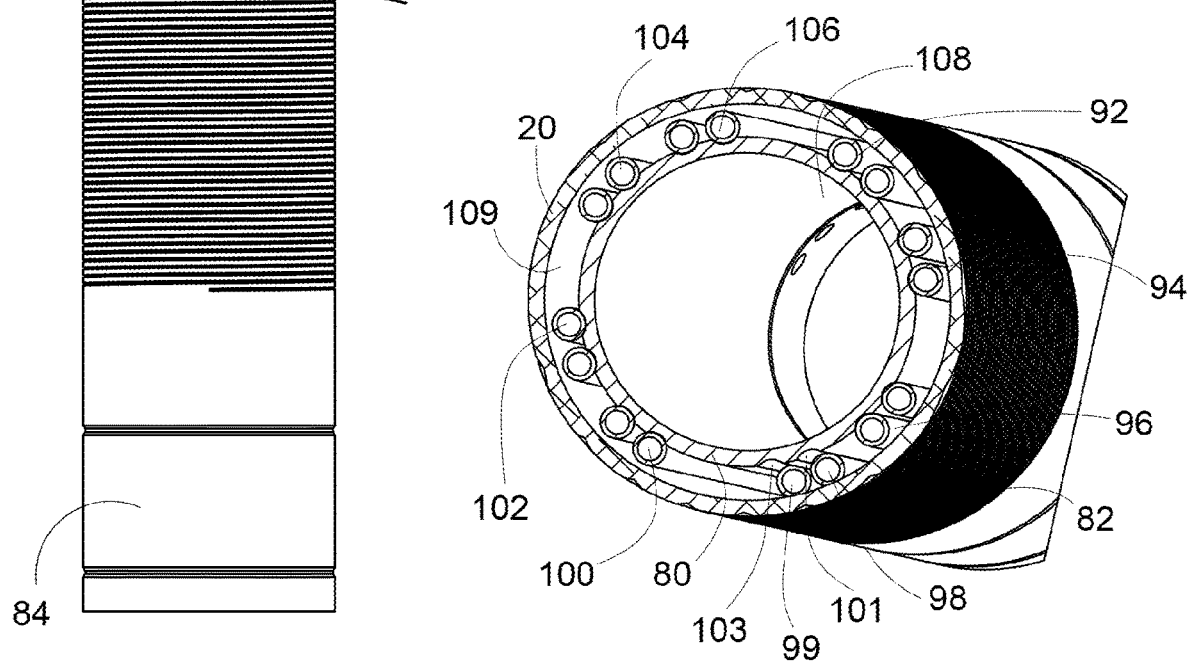
FIG. 5
FIG. 6
FIG. 7

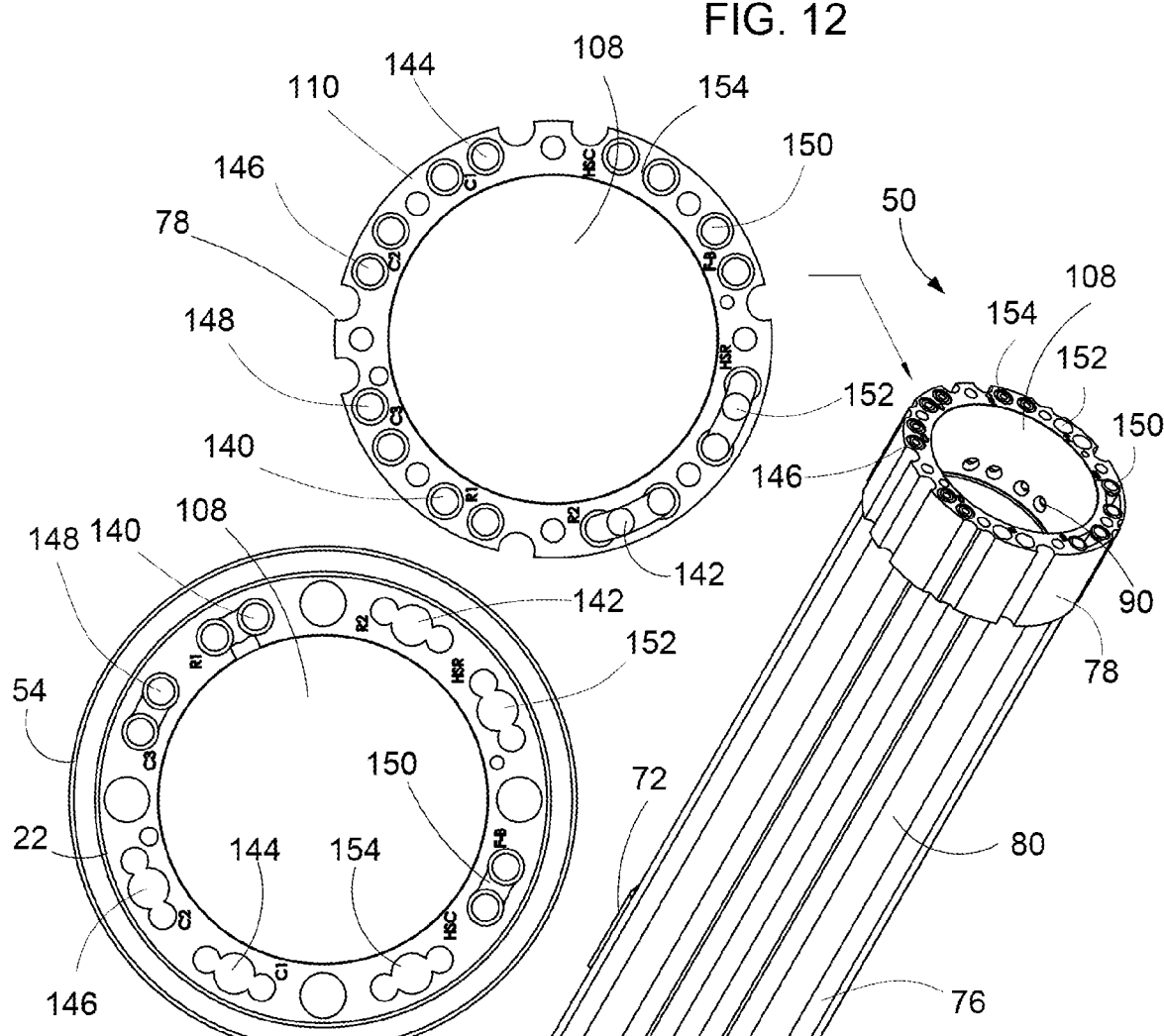
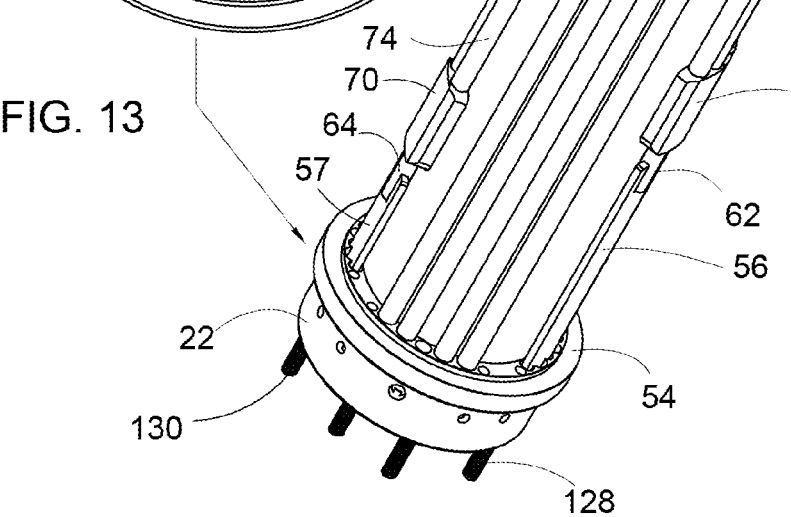

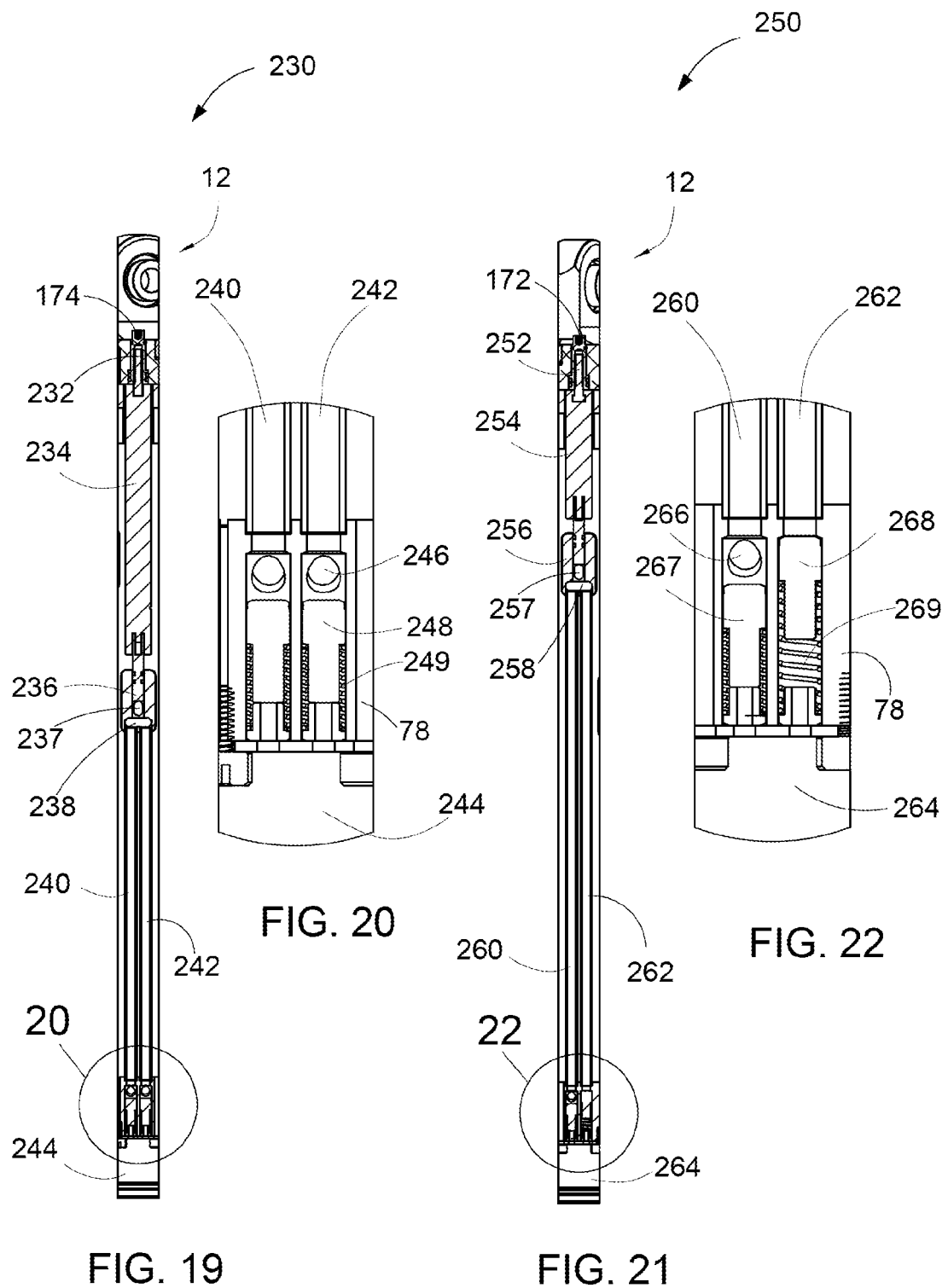

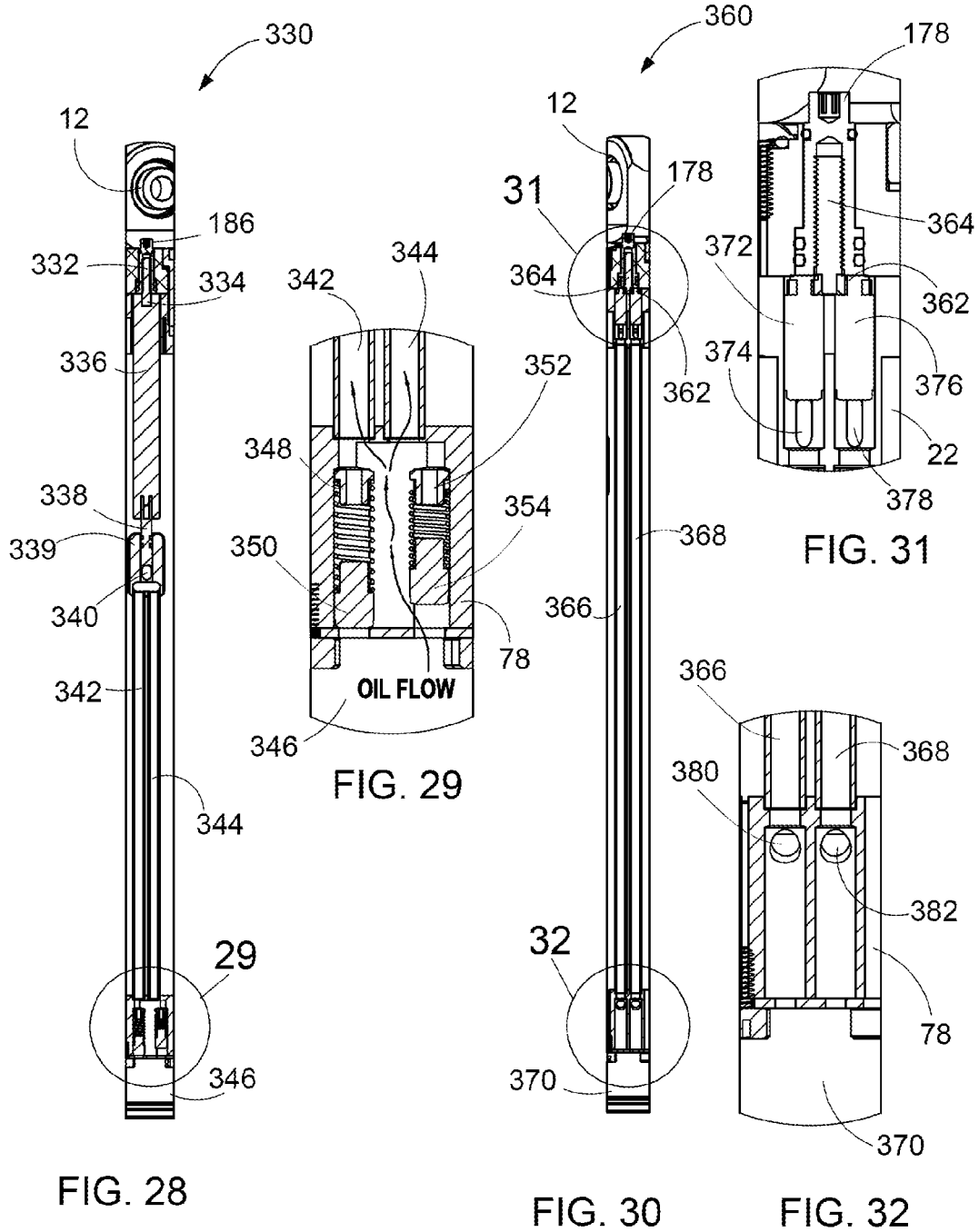

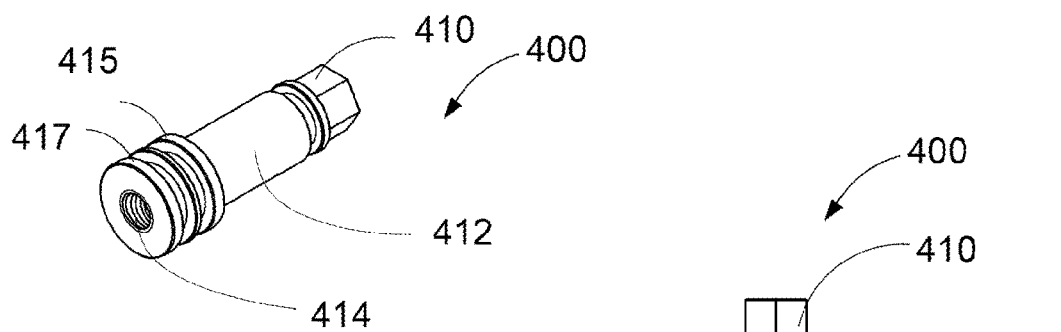
FIG. 33
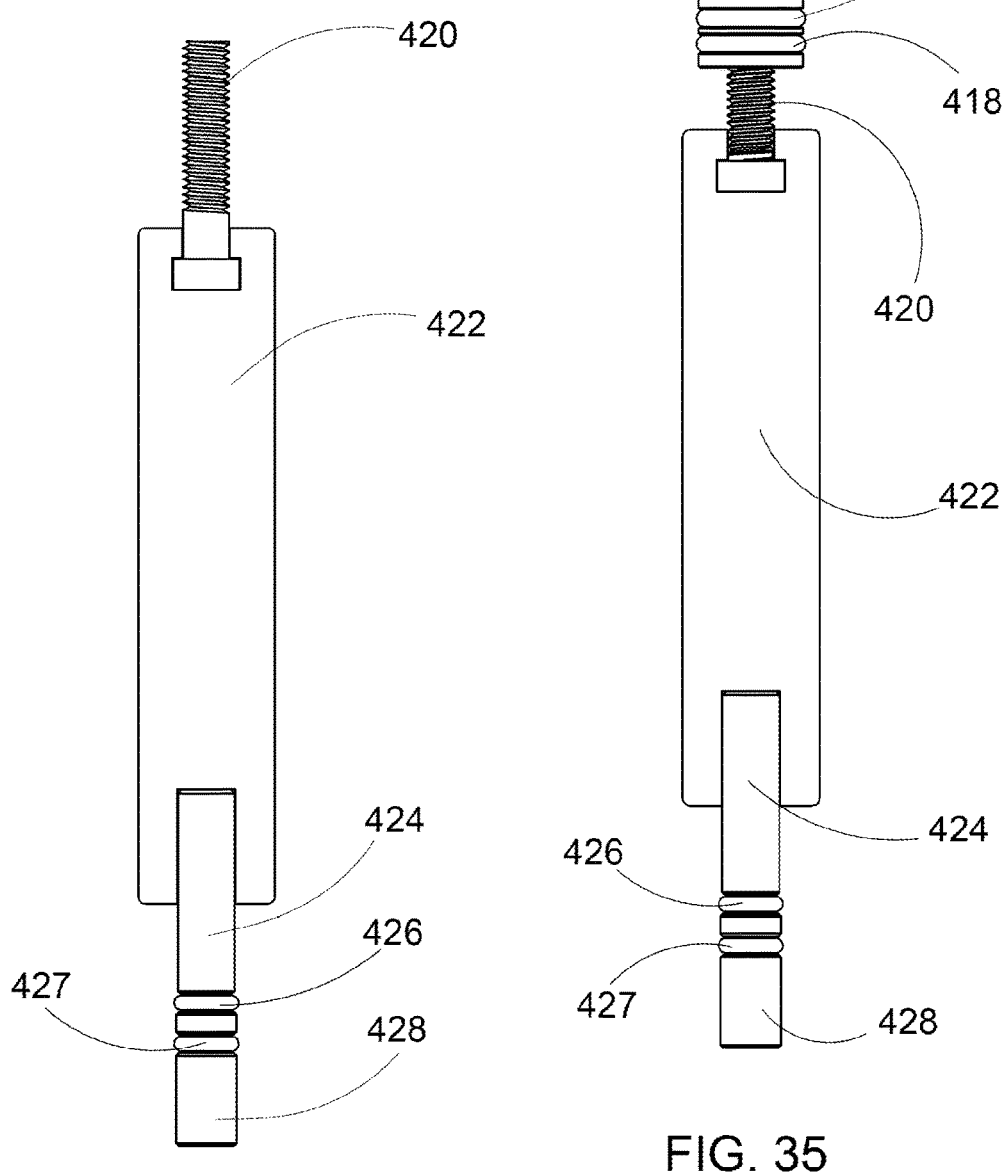
FIG. 34
FIG. 35

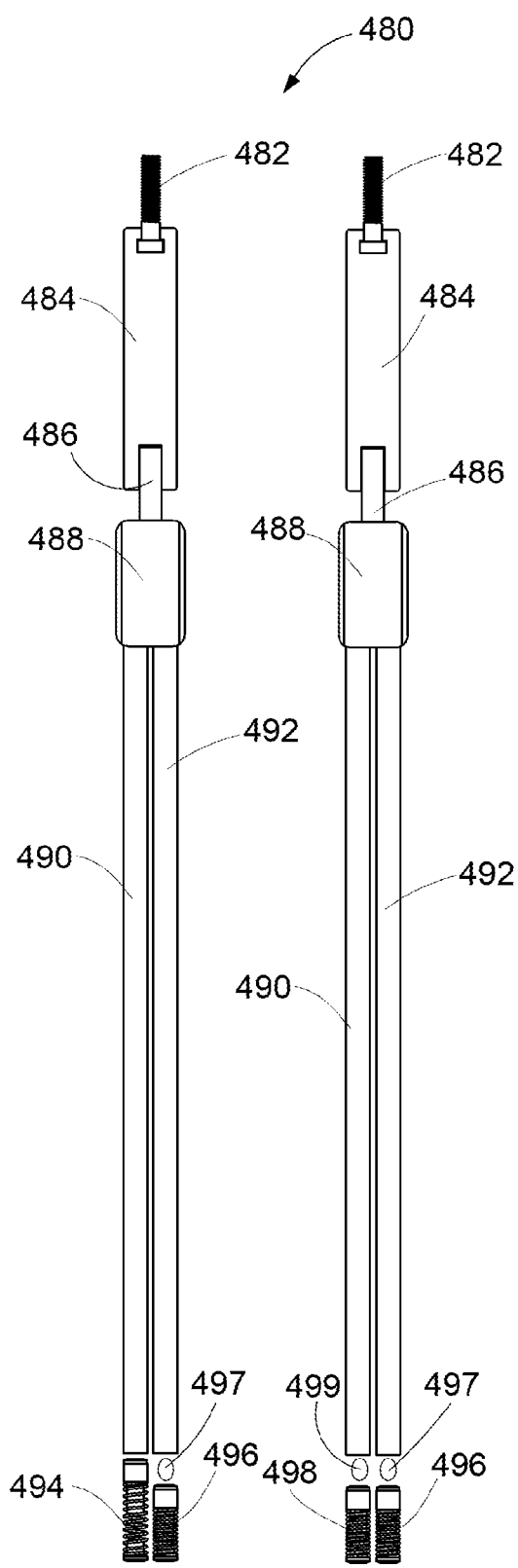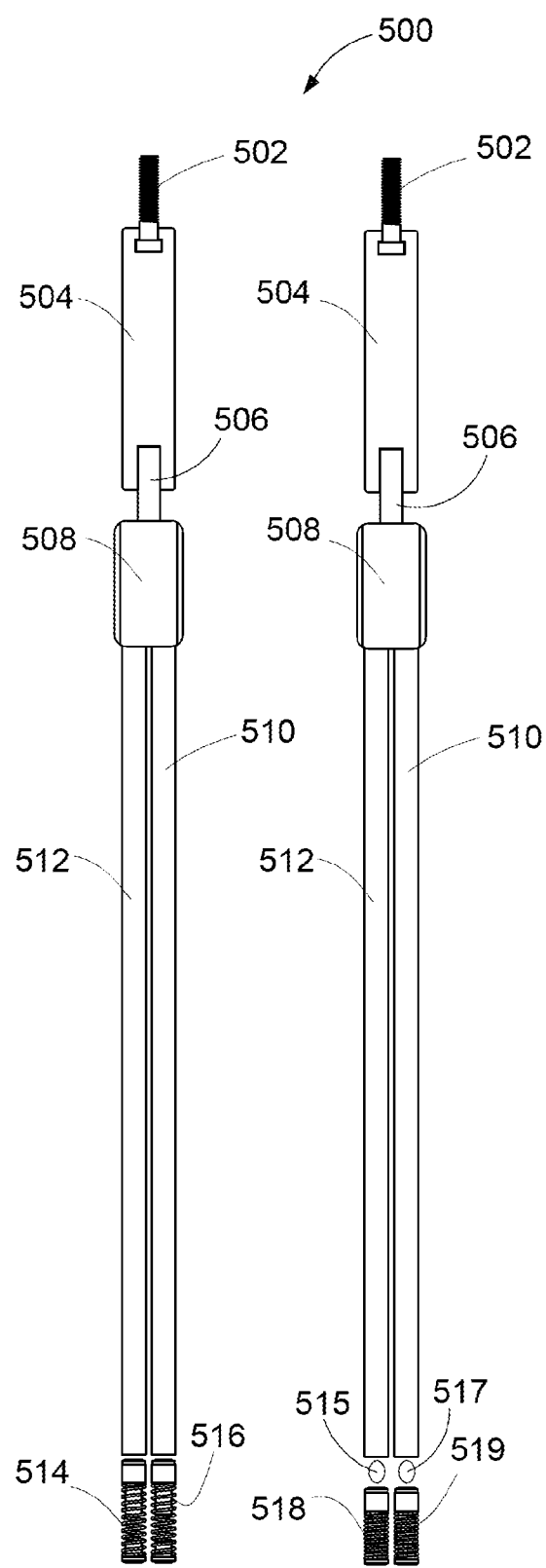
FIG. 42   FIG. 43   FIG. 44   FIG. 45

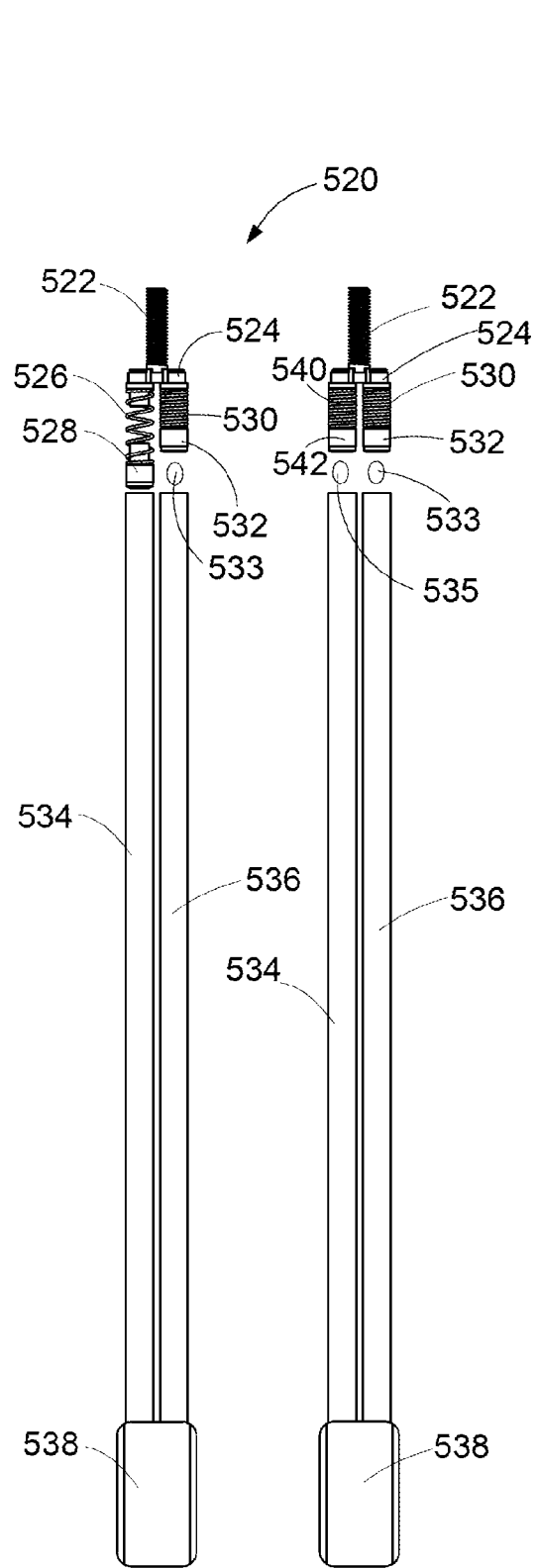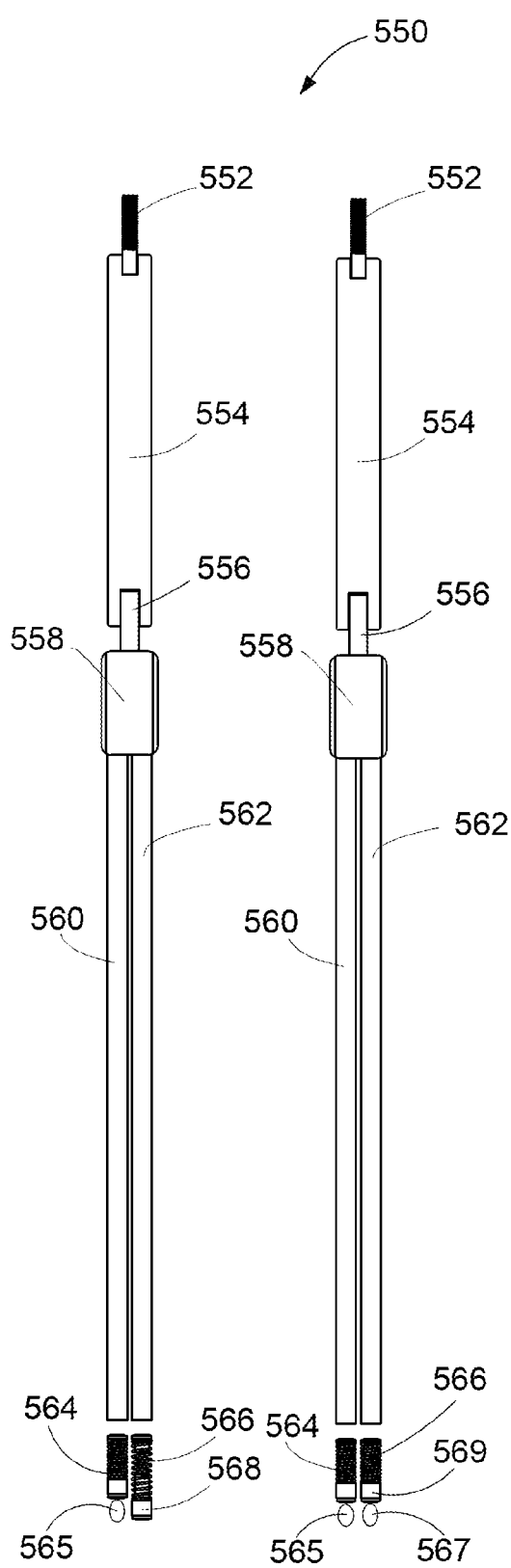
FIG. 46  FIG. 47  FIG. 48  FIG. 49

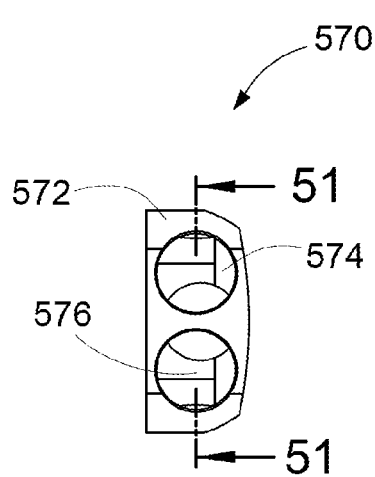
FIG. 50
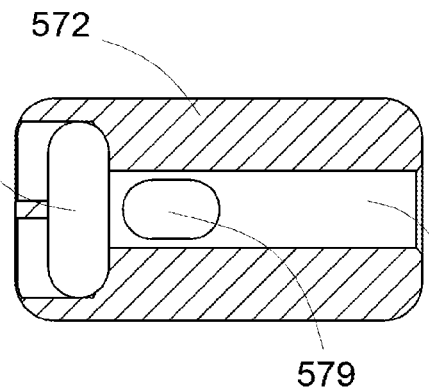
FIG. 51
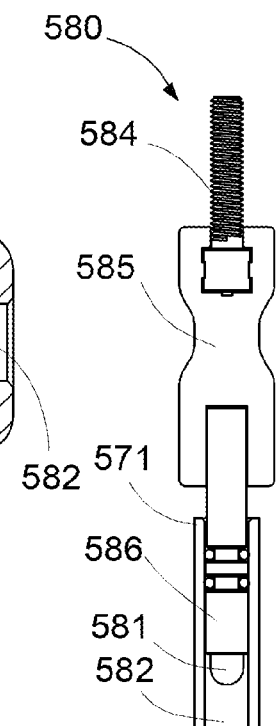
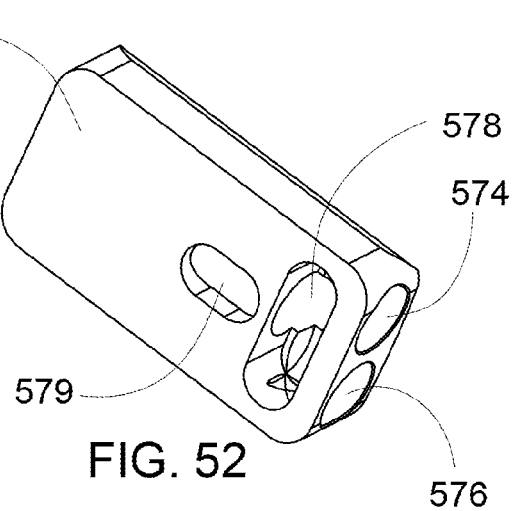
FIG. 52
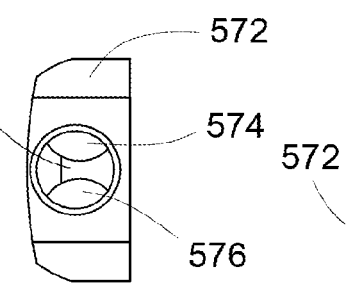
FIG. 53
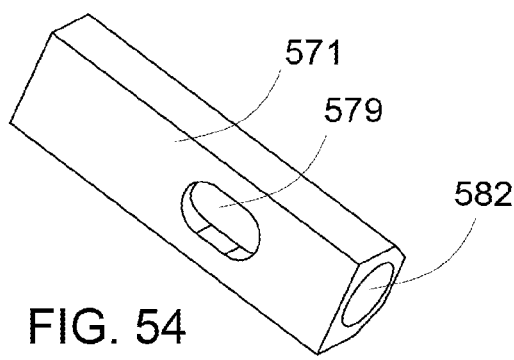
FIG. 54
FIG. 55

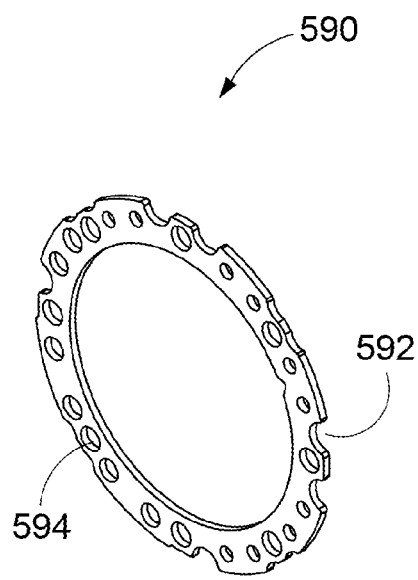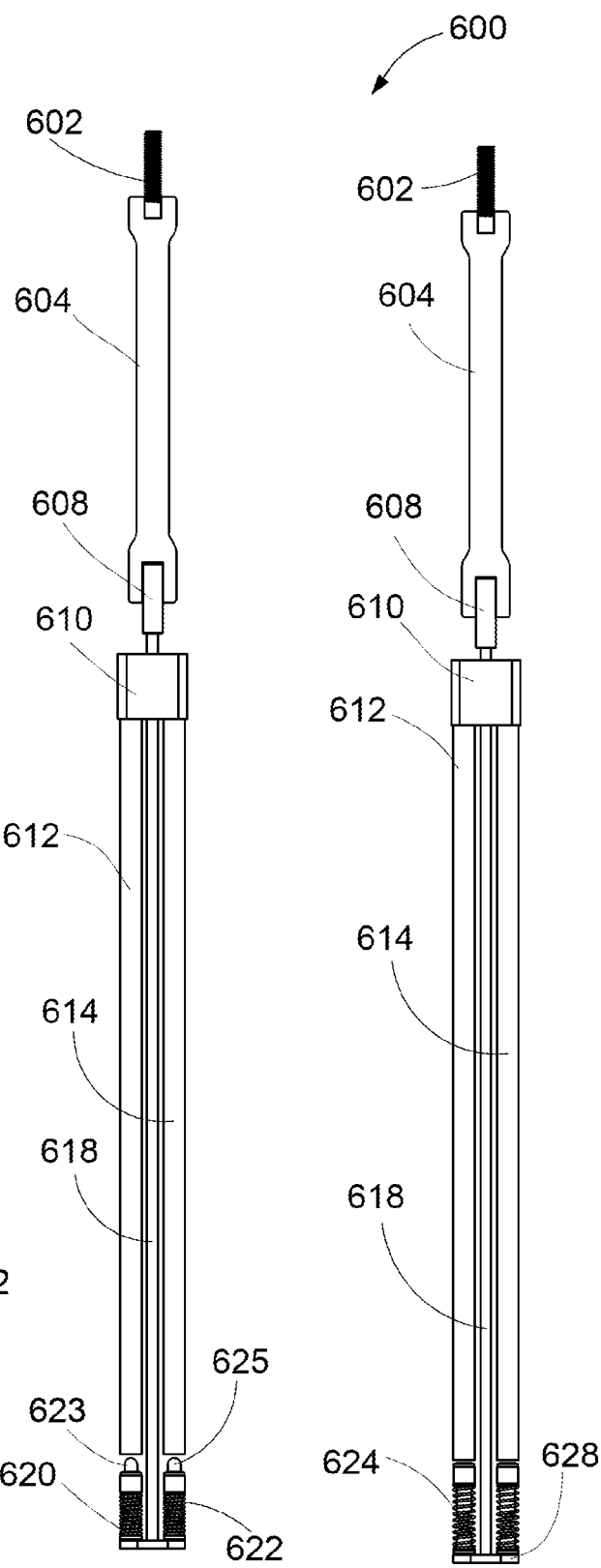
FIG. 56
FIG. 57
FIG. 58
FIG. 59

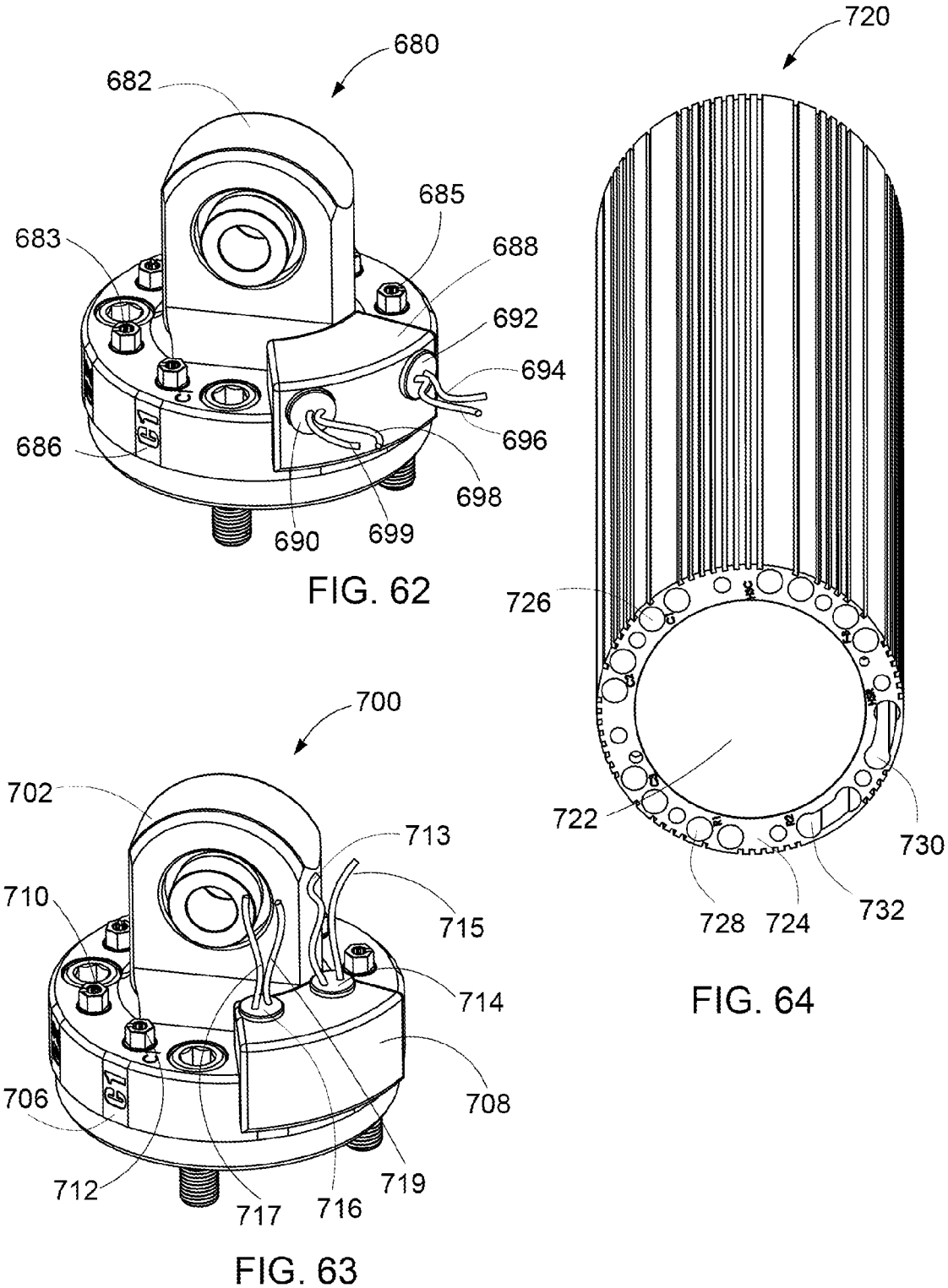

ADJUSTABLE BYPASS SHOCK ABSORBER

FIELD OF THE INVENTION

This application relates to an externally adjustable internal bypass shock absorber that combines both the suspension function and the shock absorbing function in one unit. It has an elongated shock body filled with hydraulic fluid and a piston mounted on a piston rod that reciprocally travels within the shock body. More particularly, the shock body houses a bypass cylinder that includes an upper bulkhead with adjuster rod pockets and check valves as well as a lower bulkhead having a plurality of check valves. A coil spring is mounted on the outside surface of the bypass cylinder body to provide the suspension function of the shock absorber. The bypass cylinder includes a plurality of paired bypass tubes in fluid communication with bypass adjuster valve blocks controlling the flow of hydraulic fluid within the bypass tubes. er rods are telescopically received inside the bypass adjuster block valves for controlling whether the individual ports are closed, partially open, or fully open. These adjuster rods provide an actuation means in the damper for manual or non-automatic adjustment allowing control on the external shock surface which could be manipulated externally of the shock absorber assembly to allow for compression and rebound adjustment, in both position and velocity, when configured manually and/or electronically.

BACKGROUND OF THE INVENTION

Many types of suspensions and supports include a spring and a damping device to help isolate the supported from the support structure or surface. For example, automotive vehicles commonly use separate springs and simple shock absorbers to support the vehicle frame on the axle assemblies. Simple shock absorbers are typically oil-filled cylinders within which a vented piston is mounted. The piston is connected to a shaft which extends out of one end of the cylinder. The outer end of the shaft is mounted to one point on the vehicle and the other end of the cylinder is mounted to another point on the vehicle in parallel with the suspension spring. Thus, simple shock absorbers only provide damping and not support.

Another type of shock absorber, which is the type commonly used with motorcycles, off-road vehicles, competition automotive vehicles and off-road bicycles, combines both the suspension function and the shock absorbing function in one unit. This second type of shock absorber commonly uses a spring unit, known as a coilover spring, to provide the suspension function coupled with a damping unit to provide the damping function. Conventional shock absorber designs commonly incorporate an external coil spring, an internal air spring, or an internal bladder to provide the suspension function.

A shock absorber or damper is a mechanical or hydraulic device designed to absorb and damp shock impulses. It does this by converting the kinetic energy of the shock into another form of energy (typically heat) which is then dissipated. Most shock absorbers are a form of dashpot (a damper which resists motion via viscous friction). In a vehicle, shock absorbers reduce the effect of traveling over rough ground, leading to improved ride quality and vehicle handling. While shock absorbers serve the purpose of limiting excessive suspension movement, their intended main purpose is to damp spring oscillations. Shock absorbers use the valving of oil and gasses to absorb excess energy from the springs. Spring rates are chosen by the manufacturer based on the weight of the vehicle, loaded and unloaded. Some people use shocks to modify spring rates but this is not the correct use. Along with hysteresis in the tire itself, they damp the energy stored in the motion of the unsprung weight up and down. Effective wheel bounce damping may require tuning shocks to an optimal resistance.

A shock absorber is designed to introduce damping forces, which reduces the vibrations associated with a bumpy ride. A typical shock absorber mainly consists of a piston in a reservoir of oil. When the piston moves in response to a bump in the road, holes in the piston head permit the piston to pass through the oil. Viscous forces that arise during this movement cause the damping. Typical shock absorbers (also referred to as shocks) provide two kinds of damping: compression damping (abbreviated "CD"), and rebound damping (abbreviated "RD"). One, namely, compression refers to damping force created during "inward" travel of the shaft (shortening of the shock), the other, namely, rebound refers to force created during "outward" travel of the shaft (lengthening of the shock). Generally, but not always depending on the linkage connecting shock to vehicle, RD applies during outward motion and CD applies during inward motion. Some shocks are externally adjustable by the user to provide for RD and/or CD adjustment.

Piston-type shock absorbers can be designed to provide the same amount of damping on both the compression stroke and the rebound stroke. Alternatively, the fluid passageways through the vented, damping piston can be designed so that the restriction to fluid flow through the damping piston during the compression stroke is different from the restriction to fluid flow during the rebound stroke. In this case the damping during the entire compression stroke is different from the damping during the entire rebound stroke.

Another type of damping is called position-sensitive damping. Position-sensitive damping is typically achieved by the combination of conventional vented piston damping, with the oil flowing through the damping system, plus damping provided by the passage of oil around the damping piston through a bypass chamber or channel, which permits oil to bypass the piston during part of the piston stroke. The bypass channel provides less damping over the portion of the stroke during which some fluid flows around the piston through the bypass channel. Therefore, the shock can have different damping characteristics along different segments of the stroke. This is beneficial to the user because a single set of shocks can provide smooth damping for less aggressive riding and firm damping for aggressive riding without making any adjustments during the ride. For example, the shocks can provide reduced damping in the mid-stroke zone, where the shock is most active in, for example, trail riding or other less aggressive riding. If the rider starts riding more aggressively, or hits a large bump, causing the shock to compress deeper into the stroke, the damping then becomes firmer. This type of shock absorber has been available for many years.

U.S. Pat. No. 5,178,239 illustrates another example of a position-sensitive shock absorber. The position-sensitive damping action of the bypass channel is available during both the compression and rebound strokes. U.S. Pat. No. 6,415,895 is directed to shock absorbers, including position-sensitive shock absorbers in which the position-sensitive damping can be different during compression and rebound strokes and shock absorbers with damping adjusters which vary the damping provided during compression and rebound strokes. A further aspect is directed to a shock absorber including a cylinder with a piston moveably mounted within the cylinder.

What does bypass mean? It means that the oil inside the shock body "bypasses" the normal pathway through the piston and flows around the piston. That bypass pathway is normally restricted to directly control the rebound or compression stroke of the shock. The bypass allows the fluid to flow around the piston and therefore the piston can move faster with less resistance, softening the ride. Depending on where that fluid pathway is located within the shock absorber, it can also be used to determine where the shock stiffens up to keep from bottoming out or applying correct dampening.

Bypass control is the key to shock performance. Bypass can be internal or external. An external bypass system allows for multiple dependent control positions. External tubes connect to multiple positions within the normal shaft travel, allowing you greater performance adjustment with precision. The tube placement makes them position sensitive and external tubes can be easily adjusted. With separate compression and rebound controls you can easily tune your suspension to your needs. External bypass tubes prevent the use of coilover springs and must be paired with another coil-over shock or leaf spring.

There are three types of shock reservoirs, remote, piggyback and internal. Reservoirs are used for the displacement of shock shaft volume as it travels in and out of the shock body. Remote reservoir shocks use a hose to connect a separate hydraulic fluid and gas separation reservoir with the main shock body. In most cases, off-road vehicles have plenty of room for this attachment. A Piggyback reservoir performs the same function but is attached to the shock. An internal reservoir shock has the reservoir piston in the shock tube. This works well but it makes the shock absorber much longer and often too long for easy installation. All reservoir shocks have one thing in common, the oil and the nitrogen are separated by a reservoir piston. The reservoir piston ensures that the shock body never sees any gas, which results in more consistent damping. The use of a reservoir and a coilover spring allows a shock to perform optimally but in a smaller easier to install package.

Internal bypass shock absorbers are an advanced type of shock absorber used in modern cars to improve their handling and performance on rough or uneven roads. These shock absorbers work by controlling the flow of oil through a series of bypass channels within the shock body. The history of internal bypass shock absorbers can be traced back to the early days of automotive suspension design. In the early 20th century, car manufacturers began experimenting with various types of shock absorbers to improve the ride quality and handling of their vehicles. However, these early designs were often crude and unreliable, and they were unable to provide the level of performance and comfort that modern drivers demand.

Over the years, engineers have continued to refine shock absorber designs, and in the 1960s and 70s, a number of breakthroughs were made that paved the way for the development of internal bypass shock absorbers. One of the key innovations was the use of a "twin-tube" design, which allowed for better control of the flow of oil through the shock body. In the 1980s and 90s, several companies began experimenting with the use of bypass channels within the shock body itself. The result was a smoother, more comfortable ride that also provided improved handling and performance on rough roads. Today, internal bypass shock absorbers are commonly used in a wide range of high-performance vehicles, from off-road trucks and SUVs to racing cars and sports cars. These advanced shock absorbers are designed to provide the ultimate in handling and performance, while also delivering a smooth, comfortable ride that is free from the jolts and bumps that can make driving on rough roads a challenge. As automotive technology continues to evolve, it is likely that we will see even more advanced shock absorber designs in the years to come.

An externally adjustable internal bypass shock absorber is a type of suspension component that helps to absorb and damp the forces generated by a vehicle's movement. It is designed to be externally adjustable, allowing the driver or mechanic to adjust the damping force, rebound, and compression settings to suit different driving conditions. The shock absorber has two primary components: the piston and the cylinder. The piston is located inside the cylinder and is connected to the vehicle's suspension via a shaft. The cylinder is filled with oil, which helps to dampen the forces generated by the suspension movement. The shock absorber also has an internal bypass mechanism that allows oil to flow through a series of channels and orifices around the piston. The bypass channels allow oil to bypass the piston during certain stages of the suspension travel, which helps to control the damping force.

The external adjustability of this type of shock absorber allows for the compression and rebound damping settings to be easily adjusted to meet different driving conditions. Compression damping refers to the force that resists the compression of the shock absorber, while rebound damping refers to the force that resists the extension of the shock absorber. By adjusting the compression and rebound damping settings, the driver can fine-tune the suspension to better handle different driving conditions such as bumpy roads, high-speed turns, and off-road terrain. This type of shock absorber is commonly used in high-performance vehicles and off-road vehicles that require a high level of suspension customization and tuning.

U.S. Pat. No. 7,270,222 describes an externally adjustable internal bypass shock absorber that provided both a suspension function and a damping function and included bypass passageways where the flow of hydraulic fluid can be increased or decreased by external mechanical structure in order to vary the damping characteristics of the shock.

The problem with current shock absorber products on the market is: (1) the only way to have an externally adjustable bypass shock is to have a separate emulsion shock to be used as a coil guide. What this does is provide a shock guide for the coil springs. For suspension damping a current bypass shock is used. Thus, on each corner of the car one must mount two separate shocks to have totally adjustable damping control requiring eight shocks in total; (2) the other alternative is an "internal bypass shock." Essentially this achieves the same goals as applicant's invention except it is only adjustable internally. One can use one shock per wheel, and have as much adjustability as (1) above. However, the shock has to be removed from the vehicle and disassembled to adjust the damping within the shock. This is the major drawback to this shock. It isn't practical when one wants to adjust the shocks on demand and out in the field. The way to solve both problems is to have an externally adjustable internal bypass shock. What this achieves is not only the goal of using one shock per wheel, but also having the adjustability of using two present day separate components.

In this respect, before explaining at least one embodiment of the Externally Adjustable Internal Bypass Shock Absorber in greater detail, it is to be understood that the design is not limited in its application to the details of construction and to the arrangement of the components set forth in the following description or illustrated in the drawings. The Externally Adjustable Internal Bypass Shock Absorber is capable of other embodiments and of being practiced and carried out in various ways. Also, it is to be understood that the phraseology and terminology employed herein are for the purpose of description and should not be regarded as limiting.

SUMMARY OF THE INVENTION

The primary advantage of the Externally Adjustable Internal Bypass Shock Absorber is that it allows for individualized and simultaneous oil flow control of both multiple compression cycles, rebound cycles and free bleed, with position and velocity sensitivity through the use of bypass cavities, bypass adjusters, bypass tubes and bypass tube check valves.

Another advantage of the Externally Adjustable Internal Bypass Shock Absorber is that it provides external controlling of the internal oil flow by control of the check valves to regulate damping forces within the shock during a total spectrum of smooth or rough terrain.

Yet another advantage of the Externally Adjustable Internal Bypass Shock Absorber is that as constructed it allows for separate high and low speed valving, which is missing in conventional bypass shock absorbers.

A further advantage of the Externally Adjustable Internal Bypass Shock Absorber is that each compression cycle zone resistance and rebound cycle zone resistance is fully adjustable externally.

Yet a further advantage of the Externally Adjustable Internal Bypass Shock Absorber is that compression and rebound resistance may be individually adjusted manually.

Another advantage of the Externally Adjustable Internal Bypass Shock Absorber is that compression and rebound resistance may be individually adjusted electronically.

Yet another advantage of the Externally Adjustable Internal Bypass Shock Absorber is that it may employ bypass tube pairs which are equipped with upper and lower check valve assemblies.

A further advantage of the Externally Adjustable Internal Bypass Shock Absorber is that both upper and lower check valve assemblies are adjustable externally without the need for external channels or tubes, making this amendable to a coilover spring configuration.

Another advantage of the Externally Adjustable Internal Bypass Shock Absorber is that it is configured to work in synergy with a multi check valve in-out oil flow control reservoir.

Yet another advantage of the Externally Adjustable Internal Bypass Shock Absorber is that the primary and inner shock bodies may be readily constructed using machined and welded parts.

A further advantage of the Externally Adjustable Internal Bypass Shock Absorber is that the primary and inner shock bodies may be readily constructed using extruded parts.

These together with other advantages of the Externally Adjustable Internal Bypass Shock Absorber, along with the various features of novelty, which characterize the design are pointed out with particularity in the claims annexed to and forming a part of this disclosure. For a better understanding of the Externally Adjustable Internal Bypass Shock Absorber its operating advantages and the specific objects attained by its uses, reference should be made to the accompanying drawings and descriptive matter in which there are illustrated the preferred and alternate embodiments of the Externally Adjustable Internal Bypass Shock Absorber. There has thus been outlined, rather broadly, the more important features of the design in order that the detailed description thereof that follows may be better understood, and in order that the present contribution to the art may be better appreciated. There are additional features of the Externally Adjustable Internal Bypass Shock Absorber that will be described hereinafter, and which will form the subject matter of the claims appended hereto.

The preferred embodiment of the Externally Adjustable Internal Bypass Shock Absorber will have provided an externally adjustable internal bypass shock absorber that combines both the suspension function and the shock absorbing function in one unit. It has an elongated shock body filled with hydraulic fluid and a piston mounted on a piston rod that reciprocally travels within the shock body. More particularly, the shock body houses a bypass cylinder that includes an upper bulkhead with adjuster rod pockets and a lower bulkhead having a plurality of compression check valves. A coil spring is mounted on the outside surface of the bypass cylinder body to provide a suspension function by the shock absorber. The bypass cylinder includes a plurality of bypass tubes in fluid communication with bypass adjuster valve blocks controlling the flow of hydraulic fluid within the bypass tubes. Adjuster rods are telescopically received inside the bypass adjuster block valves for controlling whether the individual ports are closed, partially open, or fully open. These adjuster rods provide an actuation means in the damper for manual or non-automatic adjustment allowing control from a distance remote from the bypass adjuster block valves, and are located on the external shock surface which could be manipulated externally of the shock absorber assembly to allow for both compression and rebound adjustment, when configured both manually and/or electronically.

In alternate embodiments of the Externally Adjustable Internal Bypass Shock Absorber it may be paired with a dual ported in-out oil flow control reservoir having valves which regulate and distribute the oil flow. Moreover, the shock body may be constructed employing both welding and extrusion of parts.

Externally Adjustable Internal Bypass Shock Absorber primary features will include as prominent design and operational features: a threaded outer shock body, a top cap assembly, a shock inner body housing bypass tubes, an upper bulkhead and lower bulkhead, bypass adjusters including plates, rods and seals, upper and lower bypass check valve assemblies, compression and rebound check valves, check valve retaining plates, adjuster rods, manual adjustment mechanisms, electronic adjustment mechanisms and a multi check valve in-out oil flow control reservoir which works in synergy with the bypass shock to control oil flow and damping at high and low speeds and on rough or smooth terrain.

With respect to the above description then, it is to be realized that the optimum dimensional relationships for the parts of the Externally Adjustable Internal Bypass Shock Absorber, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present design. Therefore, the foregoing is considered as illustrative only of the principles of the Externally Adjustable Internal Bypass Shock Absorber. Further, since numerous modifications and changes will readily occur to those skilled in the art, it is not desired to limit the Externally Adjustable Internal Bypass Shock Absorber to the exact construction and operation shown and described, and accordingly, all suitable modifications and equivalents may be resorted to falling within the scope of this application.

BRIEF DESCRIPTION OF THE DRAWINGS

The accompanying drawings, which are incorporated in and form a part of this specification, illustrate embodiments of the Externally Adjustable Internal Bypass Shock Absorber and together with the description, serve to explain the principles of this application.

FIG. 3 depicts an exploded side elevational view of the Externally Adjustable Internal Bypass Shock Absorber, illustrating the threaded outer shock body, constructed in accordance with the present invention.

FIG. 4 depicts a side elevational view of the inner shock body with the outer threaded shock body removed therefrom, illustrating the positions of the adjuster rods, bypass adjuster valve blocks, bypass tube accepting cavities, and the bypass tube pairs.

FIG. 5 depicts a side elevational view of the threaded outer shock body.

FIG. 6 depicts a bottom perspective view of the threaded outer shock body shown in FIG. 5, illustrating the position of the inner bypass cylinder.

FIG. 7 depicts a cross-sectional view of the threaded outer shock body shown in FIG. 5, illustrating the position of the bypass tube pairs and the inner body.

FIG. 12 depicts a bottom end view of the lower bulkhead as shown in FIG. 14, illustrating the location of various adjuster rod pockets, rebound, and free bleed bypass ports.

FIG. 13 depicts a top end view of the upper bulkhead as shown in FIG. 14, illustrating the location of various compression and rebound bypass ports.

FIG. 14 depicts a bottom perspective view of the assembled inner shock body.

FIG. 19 depicts a cross-sectional view of the compression bypass zone 1 (C1) as shown in FIG. 18.

FIG. 20 depicts a cross-sectional close-up detailed view of the check valve housing of C1, shown in a high-speed configuration, as illustrated in FIG. 19.

FIG. 21 depicts a cross-sectional view of the compression bypass zone 2 (C2) as shown in FIG. 18.

FIG. 22 depicts a cross-sectional close-up detailed view of the check valve housing of C2, shown in a low-speed configuration, as illustrated in FIG. 21.

FIG. 28 depicts a cross-sectional view of the rebound bypass zone 2 (R2) as shown in FIG. 18.

FIG. 29 depicts a cross-sectional close-up detailed view of the lower check valve housing of R2, shown in a low-speed configuration, as illustrated in FIG. 28, here illustrating the oil flow direction within the check valve with flow direction arrows.

FIG. 30 depicts a cross-sectional view of the free bleed zone (FB) as shown in FIG. 18.

FIG. 31 depicts a cross-sectional close-up detailed view of the upper valve housing of FB, as illustrated in FIG. 30.

FIG. 32 depicts a cross-sectional close-up detailed view of the lower valve housing of FB, as illustrated in FIG. 30.

FIG. 33 depicts a bottom perspective view of a single bypass adjuster having an internally threaded center portion.

FIG. 34 depicts a side elevational view of a bypass adjuster plate having an externally threaded rod upper portion and an O-ring sealed lower rod portion.

FIG. 35 depicts a single assembled bypass adjuster, bypass adjuster plate and O-ring sealed lower rod portion in which the bypass adjuster shown in FIG. 33 has been threaded on to the externally threaded rod upper portion of the bypass adjuster plate shown in FIG. 34.

FIG. 42 depicts a compression zone bypass adjuster assembly including a bypass adjuster plate at the top, a bypass adjuster block in the middle, and a pair of bypass tubes having bypass check valves located at each tubes lower end shown with differing spring rates on each check valve whereas one opens and the other remains closed in a low shaft speed situation.

FIG. 43 depicts a compression zone bypass adjuster assembly including a bypass adjuster plate at the top, a bypass adjuster block in the middle, and a pair of bypass tubes having bypass check valves located at each tubes lower end shown with differing spring rates on each check valve whereas both check valves open in a high shaft speed situation.

FIG. 44 depicts a high-speed compression zone bypass adjuster assembly including a bypass adjuster plate at the top, a bypass adjuster block, and a pair of bypass tubes having bypass check valves located at each tubes lower end shown closed in a low shaft speed situation in which both check valves are closed.

FIG. 45 depicts a high-speed compression zone bypass adjuster assembly including a bypass adjuster plate at the top, a bypass adjuster block in the middle, and a pair of bypass tubes having bypass check valves located within each tubes lower end shown open in a high shaft speed situation in which both check valves are open.

FIG. 46 depicts an upper rebound zone bypass adjuster assembly including an upper check valve assembly illustrating one valve in the open position and one valve in the closed position in a low shaft speed situation.

FIG. 47 depicts an upper rebound zone bypass adjuster assembly including an upper check valve assembly illustrating both valves in the open position.

FIG. 48 depicts a lower rebound zone bypass adjuster assembly including a bypass adjuster plate at the top, a bypass adjuster block in the middle, and a pair of bypass tubes having bypass check valves located within each tubes lower end illustrating one valve in the open position and one valve in the closed position in a low shaft speed situation.

FIG. 49 depicts a lower rebound zone bypass adjuster assembly including a bypass adjuster plate at the top, a bypass adjuster block in the middle, and a pair of bypass tubes having bypass check valves located within each tubes lower end illustrating both valves in the open position in a high shaft speed situation.

FIG. 50 depicts a bottom plan view of an empty (disassembled) bypass adjuster block.

FIG. 51 depicts a cross-sectional view of the empty (disassembled) bypass adjuster block as shown in FIG. 50.

FIG. 52 depicts a bottom and rear perspective view of the empty (disassembled) bypass adjuster block as shown in FIG. 50.

FIG. 53 depicts a top view of the empty (disassembled) bypass adjuster block as shown in FIG. 50.

FIG. 54 depicts a bottom and rear perspective view of the empty (disassembled) bypass adjuster block as shown in FIG. 55 (below).

FIG. 55 depicts a single tube compression zone bypass adjuster assembly including a bypass adjuster plate at the top, a bypass adjuster block in the middle, and a bypass tube having a single bypass check valve located at the tube lower end.

FIG. 56 depicts a top and side elevational perspective view of a check valve retaining plate.

FIG. 57 depicts a top plan view of the check valve retaining plate shown in FIG. 56.

FIG. 58 depicts a side elevational view of a fully assembled bypass adjuster assembly, including a bypass plate having an upper threaded rod portion, a pair of bypass tubes and an adjuster rod centrally located between the tube pair, for the purpose of adjusting the pair of lower check valves located at the lower end of each bypass tube shown in a partially closed configuration.

FIG. 59 depicts a side elevational view of a fully assembled bypass adjuster assembly, including a bypass plate having an upper threaded rod portion, a pair of bypass tubes and an adjuster rod centrally located between the tube pair, for the purpose of adjusting the pair of lower check valves located at the lower end of each bypass tube shown in an open configuration.

FIG. 62 depicts a top cap assembly having an electronic adjuster mechanism attached to two of the adjusters, having the wiring extending laterally away from the electronic adjuster mechanism, to allow for remote electronic adjustment of the bypass shock so equipped.

FIG. 63 depicts a top cap assembly having an electronic adjuster mechanism attached to two of the adjusters, having the wiring extending upwardly away from the electronic adjuster mechanism, to allow for remote electronic adjustment of the bypass shock so equipped.

FIG. 64 depicts an example of an extruded shock body as optionally manufactured instead of the modular shock body construction.

DETAILED DESCRIPTION OF THE PREFERRED EMBODIMENTS

As required, the detailed embodiments of the present Externally Adjustable Internal Bypass Shock Absorber 10 are disclosed herein, however, it is to be understood that the disclosed embodiments are merely exemplary of the design that may be embodied in various forms. Therefore, specific functional and structural details disclosed herein are not to be interpreted as limiting, but merely as basic for the claims and as a representative basis for teaching one skilled in the art to variously employ the present design in virtually any appropriately detailed structure as well as combination.

Figure 1:
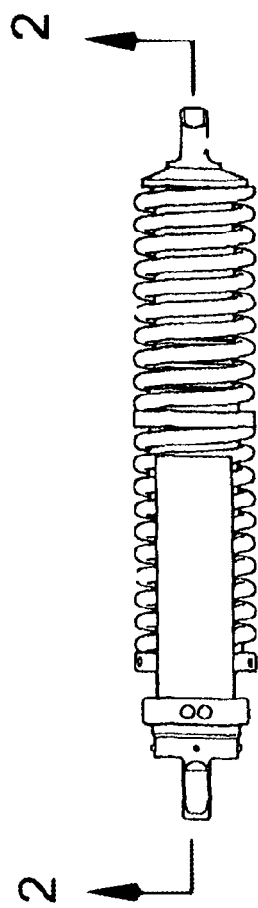
FIG. 1 depicts a side elevational prior art coilover shock absorber having a shock oil reservoir attached thereto.

FIG. 1 depicts a side elevational view of a prior art coilover shock absorber having a shock oil reservoir attached thereto. This shock absorber embodiment has been representative of the state of the art of externally adjustable internal bypass shock absorbers since 2007 when inventor Brandon Aymar was issued U.S. Pat. No. 7,270,222.

Figure 2:
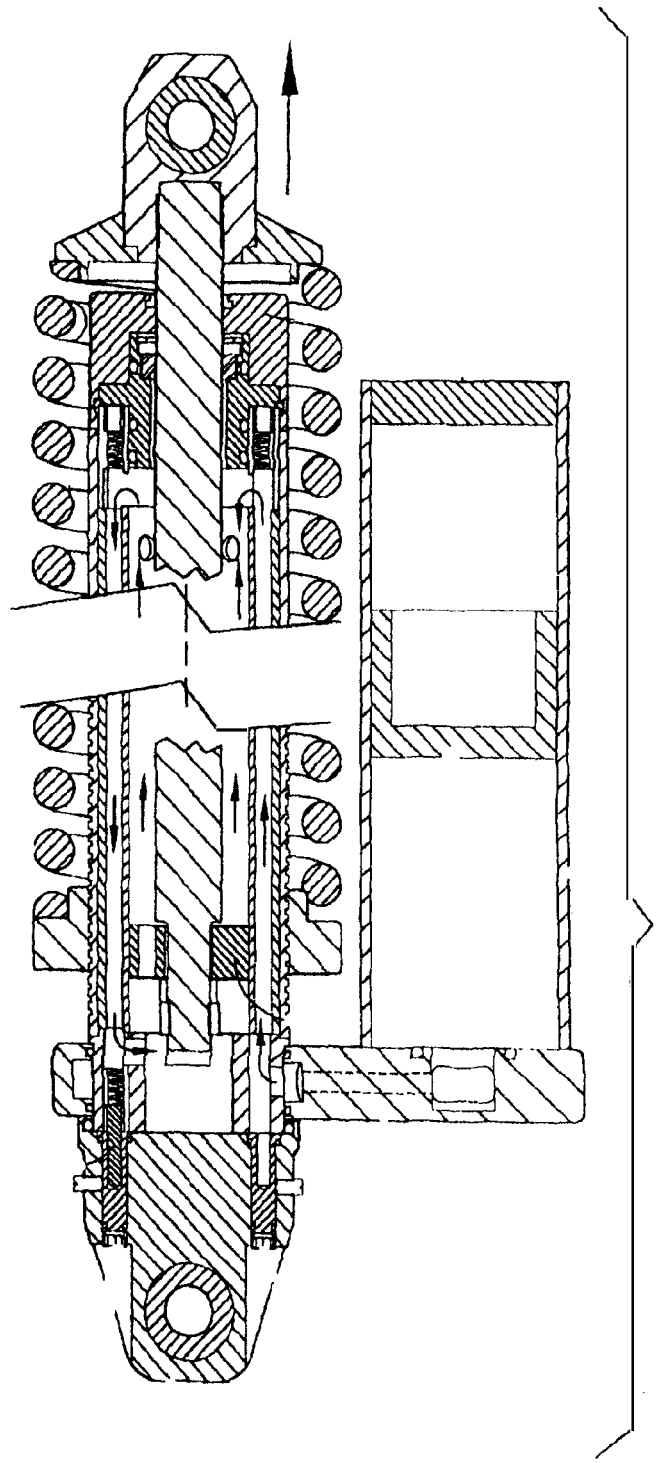
FIG. 2 depicts a cross-sectional view of the prior art coilover shock absorber having a shock oil reservoir attached thereto having arrows indicating the oil flow directions within the shock cylinder body.

FIG. 2 depicts a cross-sectional view of the prior art coilover shock absorber as shown in FIG. 1, having a shock oil reservoir attached thereto, and illustrating direction arrows indicating the oil flow directions within the shock cylinder body. The rebound cycle (RB) is illustrated in this prior art FIG. 1 and FIG. 2. As the piston travels rearwardly, hydraulic fluid is pushed rearwardly toward bottom bulkhead and radially outward and upward through the bypass channel. This fluid then compresses a check valve which allows the fluid to enter back into the interior chamber. Adjustment of the various bypass adjusters can vary the damping effects in the different compression zones and different rebound zones in this prior art shock absorber configuration.

FIG. 3 depicts an exploded side elevational view of the Externally Adjustable Internal Bypass Shock Absorber 10, illustrating the various parts such as the top cap assembly 12 having a bearing spacer, including a top cap housing 14 having a series of orifices therein, a threaded outer shock body 20 having an upper bulkhead 22 and a spring divider 24, constructed in accordance with the present invention. Also seen in this FIG. 3 is a shaft rod end 16 having a bearing spacer, a lower spring collar 18, a piston shaft 26, a piston seal body 28 and a piston head 30. A coilover spring 32 is held in place externally to the threaded outer shock body by a top threaded spring collar 34 on the upper end and the lower spring collar 18 on the lower end integral to the shaft rod end 16. To adjust tension in the coilover spring 32, the top threaded spring collar 34 is threaded along the threaded outer shock body 20 upwardly or downwardly as required. Also illustrated in this FIG. 3 is the position of a piggyback reservoir assembly 40 having a reservoir manifold 36 sandwiched and secured between the top cap assembly 12 and the upper bulkhead 22 of the threaded outer shock body 20. This reservoir manifold 36 secures the piggyback reservoir 38 to the Externally Adjustable Internal Bypass Shock Absorber 10.

FIG. 4 depicts a side elevational view of the inner shock body 50 with the outer threaded shock body 20 removed therefrom, illustrating the positions of the adjuster rods, bypass adjuster valve blocks, bypass tube accepting cavities, and the bypass tube pairs. The inner shock body 50 acts to support all the inner components and is comprised of an upper bulkhead 22 having a plurality of threaded rods 52 extending therein, and a lower sealing surface 54. Below the upper bulkhead 22 extend a plurality of adjuster plates 56, 58 and 60 which attach to adjuster rod pistons 62, 64 and 66, respectively. These adjuster rod pistons then extend down into bypass adjuster blocks 68, 70 and 72 located at various distances away from the upper bulkhead 22. Extending below the bypass adjuster blocks are a pair of bypass tubes 74 and 76. These bypass tubes 74 and 76 are inserted into and supported by the lower bulkhead 78. A cutaway view clearly shows bypass tube accepting cavities 81 and 83 which are longitudinally recessed to accept bypass tubes 74 and 76, respectively. When assembled, all of these aforementioned parts are radially disposed around the cylindrical body 80 of the inner shock body 50.

FIG. 5 depicts a side elevational view of the threaded cylindrical outer shock body 20. The threads 82 extend down to about three-fourths of the cylindrical outer shock body 20 and are used to adjust tension to the coilover spring 32 (see FIG. 3). The upper portion of the cylindrical outer shock body 20 includes the upper bulkhead 22 and the lower portion 84 of the cylindrical outer shock body 20 is devoid of threads.

FIG. 6 depicts a bottom perspective view of the threaded cylindrical outer shock body 20 shown in FIG. 5, illustrating the position of the inner bypass cylinder body 50. The cylindrical outer shock body 20 acts as a casing for the inner bypass cylinder body 50. In this bottom view, there can be seen the lower bulkhead 78 of the inner bypass body and within the lower bulkhead can be seen the plurality of reservoir port holes 88 and 89 for accommodating an oil pathway to the upper bulkhead 22. A plurality of check valve port holes 86 and 87 can be seen which accommodate bypass tubes (not seen, see FIG. 7) for the compression zone, the rebound zone and the free bleed zone (see below). Also, on the inner wall of the inner body 50 are seen oil flow holes 90. The reservoir port holes 88 and 89 are located at the bottom of the shock body assembly for a much more effective bump zone also known as the final compression zone.

FIG. 7 depicts a cross-sectional view of the threaded outer shock body shown in FIG. 5, illustrating the position of the inner bypass cylinder body 50, and the plurality of bypass tube pairs 92, 94, 96, 98, 100, 102, 104 and 106. The inner hollow section 108 of the inner bypass cylinder body 50 is where the piston head 30 is located and where the piston head 30 travels up and down this hollow section 108 during compression and rebound cycles. The cavity 109 seen between inner shock body 80 and threaded outer shock body 82 is oil filled and is used as a pathway for oil to move between the shock body 20 and piggyback reservoir assembly 40 via upper bulkhead 22. Bypass tube accepting cavities 101 and 103 are longitudinally recessed to house bypass tubes 98 and 99, respectively.

Figure 8:
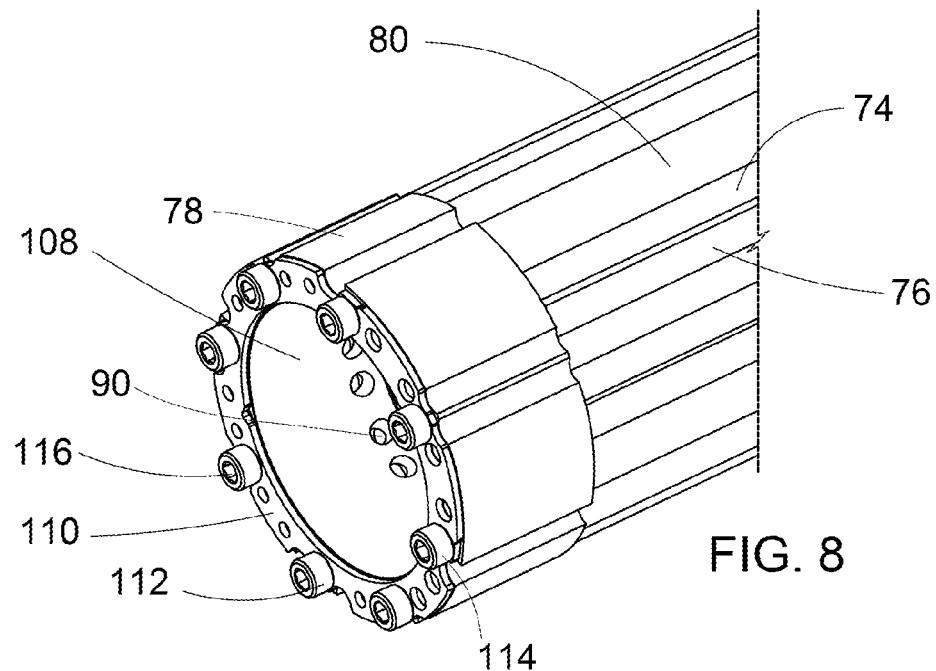
FIG. 8 depicts a partial bottom perspective view of the lower bulkhead of an assembled inner shock body.

FIG. 8 depicts a partial bottom perspective view of the lower bulkhead 78 of an assembled inner shock body 80. Retaining bolts 112, 114 and 116 are used to secure the check valve retaining plate 110 to the bottom of the lower bulkhead 78 of the inner shock body 80. Bypass tube pairs such as bypass tubes 74 and 76 can be seen on the outer surface of the inner shock body 80.

Figure 9:
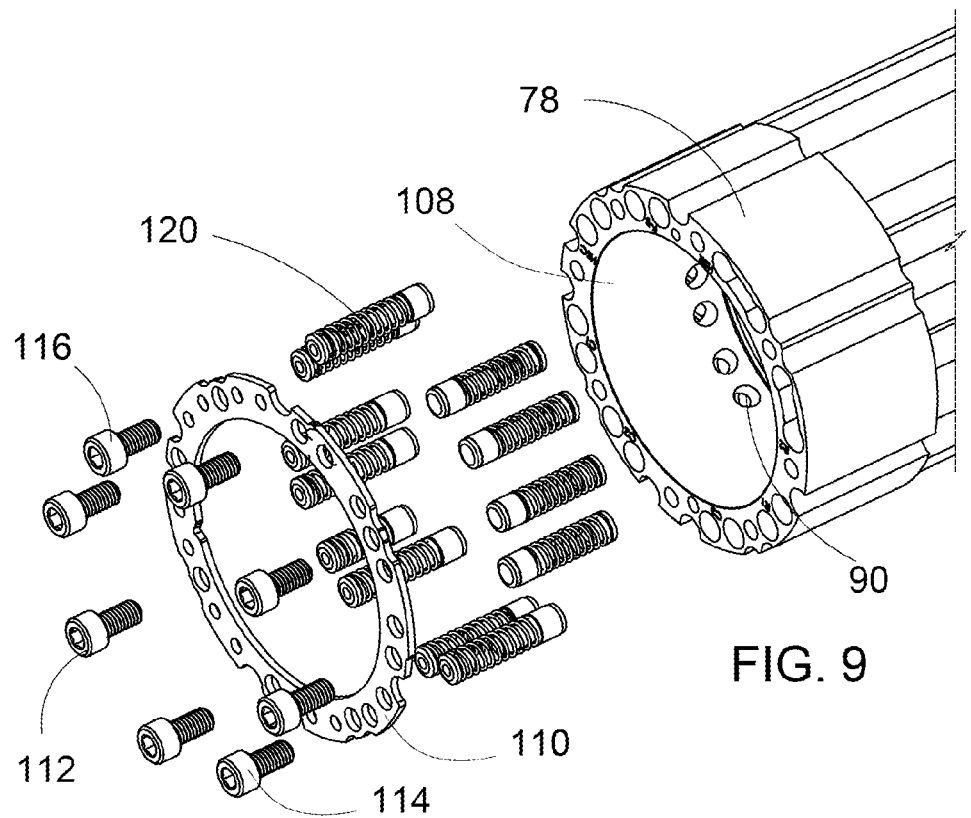
FIG. 9 depicts an exploded partial bottom perspective view of the lower bulkhead of a disassembled inner shock body as shown in FIG. 8.

FIG. 9 depicts an exploded partial bottom perspective view of the lower bulkhead of a disassembled inner shock body as shown in FIG. 8. Here in this disassembled view, the retaining bolts 112, 114 and 116 have been unthreaded out of the lower bulkhead 78 threaded mating orifices releasing the check valve retaining plate 110 and exposing the plurality of check valves 120. The plurality of lower check valve assemblies 120 are secured in place within the lower bulkhead 78 using the check valve retaining plate 110 and the retaining bolts 112, 114 and 116. The check valves 120 are positioned at the bottom of each bypass tube and the check valves 120 line up with other orifices in the check valve retaining plate 110 and allow oil within the shock to move in and out of each check valve 120 retained therein. When constructed, the plurality of check valve assemblies 120 are inserted into the accepting orifices within the lower bulkhead 78, then retained by the check valve retaining plate 110 which is secured using the retaining plate securing bolts 112, 114 and 116 as seen in the assembled view of FIG. 8.

These accepting orifices are located at the bottom of each bypass tube configured to be the compression, rebound and free-bleed zones. This is fully explained in greater detail below.

Figure 10:
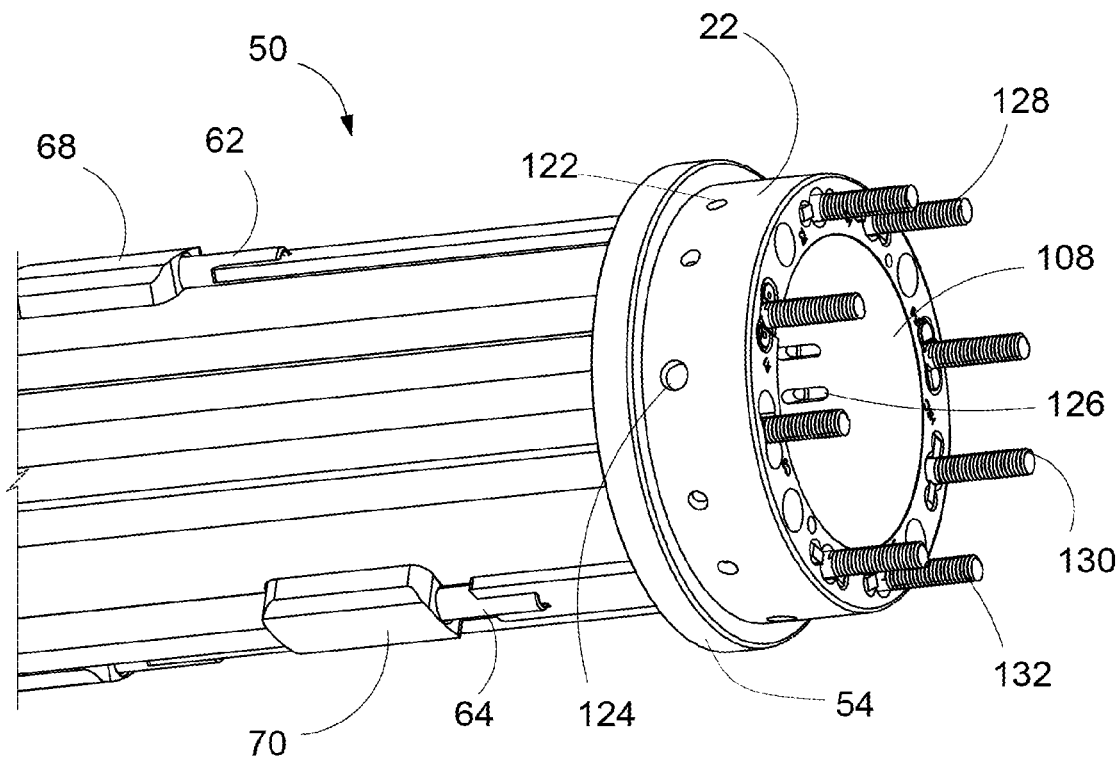
FIG. 10 depicts a top perspective partial view of an upper bulkhead of an assembled inner shock body.

FIG. 10 depicts a top perspective partial view of an upper bulkhead 22 of an assembled inner shock body 50. In this assembled view, the upper bulkhead 22 has a plurality of orifices in which a plurality of check valve assemblies are inserted, as exemplified by threaded portions 128, 130 and 132 which are the exposed portions of these check valve assemblies (see FIG. 11 below). The upper bulkhead also includes external oil flow orifices 122 and 124 as well as internal oil flow orifices 126 within the piston travel cavity 108. When constructed, the upper bulkhead 22 is secured by a top cap (not seen here). When fully assembled, the shock piston travels up and down within cavity 108 of the inner shock body 50 and oil is forced into and out of said cavity 108 through oil flow orifice 126. Internal oil flow orifices 126 direct oil around the shock piston during compression and rebound cycles whereas external oil control orifices 122 and 124 direct oil out to the reservoir 38 via reservoir assembly 40.

Figure 11:
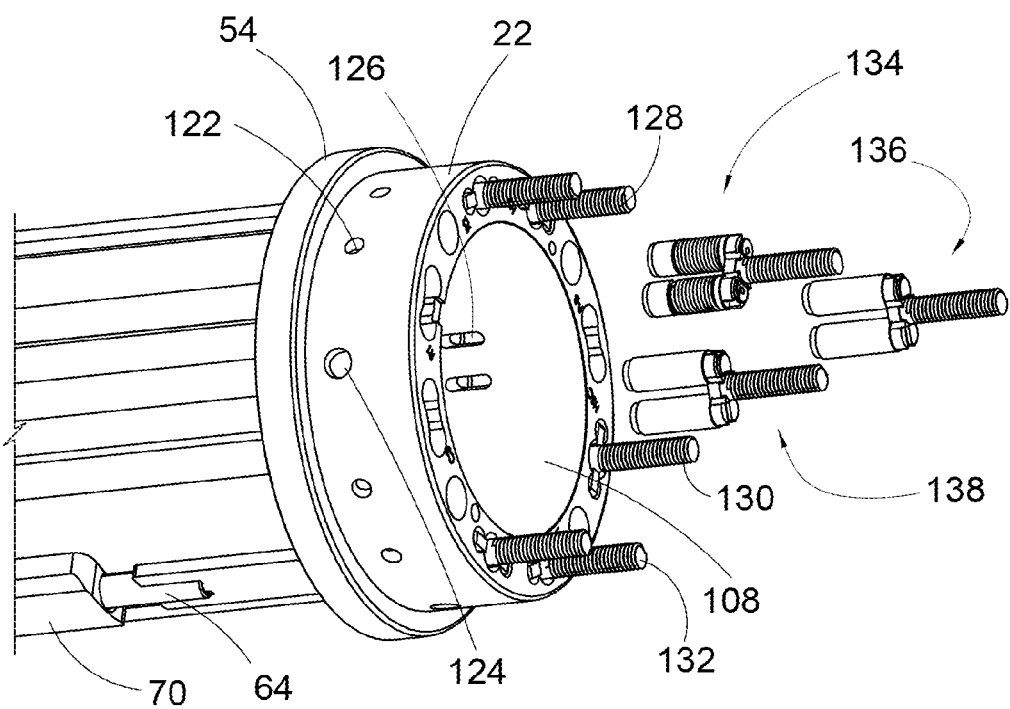
FIG. 11 depicts an exploded top perspective partial view of the upper bulkhead of an assembled inner shock body, as shown in FIG. 10.

FIG. 11 depicts an exploded top perspective partial view of the upper bulkhead 22 of an assembled inner shock body 50, as shown in FIG. 10. The plurality of upper bypass check valves 134, 136 and 138 are shown exploded away from the upper bulkhead 22. Several of the other upper bypass check valves assemblies have only the threaded portions 128 and 132 exposed.

FIG. 12 depicts a bottom end view of the lower bulkhead 78 as shown in FIG. 14 (see below), illustrating the location of the inner piston cavity 108 and various check valve pockets. Bypass valve pockets for the rebound 1 (RB1) zone 140, the rebound 2 (RB2) zone 142 the compression 1 (C1) zone 144, the compression 2 (C2) zone 146, the compression 3 (C3) zone 148 are clearly seen in this FIG. 12 view, as well as the free-bleed (FB) zone 150, the high speed rebound (HSR) zone 152 and the high speed compression (HSC) zone 154.

FIG. 13 depicts a top end view of the upper bulkhead 22 as shown in FIG. 14 (see below), illustrating the location of the upper bulkhead sealing surface 54, the inner piston cavity 108, and various compression, rebound and free-bleed bypass adjuster valve assembly pockets. Again, corresponding bypass adjuster valve assembly pockets for the rebound 1 (RB1) zone 140, the rebound 2 (RB2) zone 142 the compression 1 (C1) zone 144, the compression 2 (C2) zone 146, the compression 3 (C3) zone 148 are clearly seen in this FIG. 12 view, as well as the free-bleed (FB) zone 150, the HSR zone 152 and the HSC zone 154.

FIG. 14 depicts a bottom perspective view of the assembled inner shock body 50. The inner shock body 50 acts to support all of the inner shock parts and is comprised of an upper bulkhead 22 containing a plurality of threaded rod portions of bypass valves 128 and 130 extending therein, and a bulkhead sealing surface 54. The threaded rods of bypass adjuster valves 128 and 130 connect to adjuster rod plates 56 and 57 that extend down to adjuster rods 62 and 64 and into bypass adjuster blocks 68, 70 and 72 (partially seen) located at various distances away from the upper bulkhead 22. Extending below the bypass adjuster blocks are a pair of bypass tubes 74 and 76 and these bypass tubes 74 and 76 are inserted into and supported by the lower bulkhead 78. The lower bulkhead 78 contains a plurality of check valve accepting orifices 146, 150, 152 and 154. When assembled, all of these aforementioned parts are radially disposed around the cylindrical body 80 of the inner shock body 50. Internal oil flow orifices 90 allow for the oil to flow in and out of the piston cavity 108 when the shock is compressing or rebounding, as required.

Figure 15:
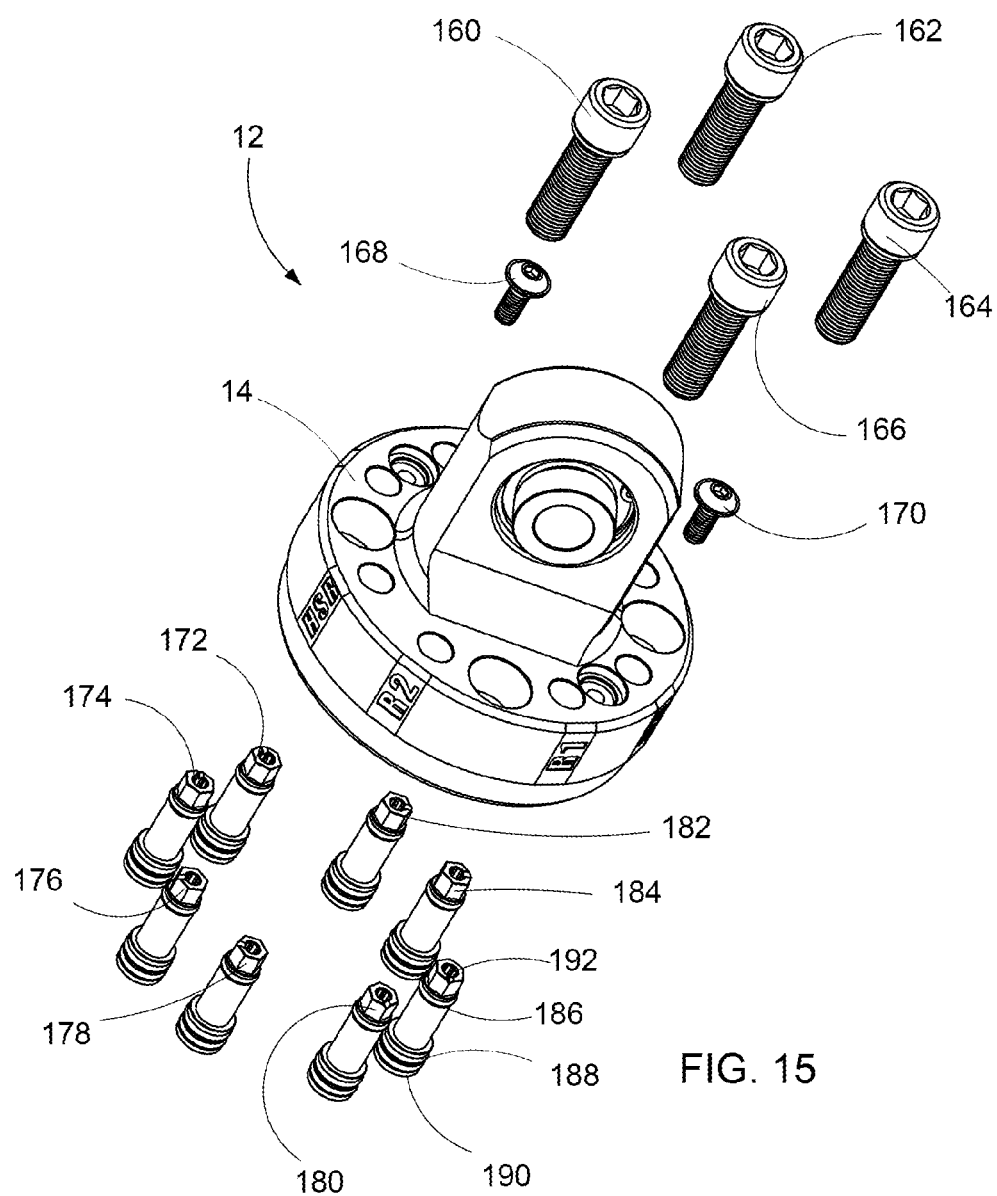
FIG. 15 depicts an exploded top perspective view of the top cap assembly illustrating the top cap retaining bolts and the bypass adjusters.

FIG. 15 depicts an exploded top perspective view of the top cap assembly 12 illustrating the top cap housing 14, the four top cap retaining bolts 160, 162, 164 and 166, the two shock bleed screws 168 and 170, and the bypass adjuster accepting orifices within the top cap housing 14. The bypass adjusters 172, 174, 176, 178, 180, 182, 184 and 186 each include a body portion 188, a top bolt portion 192 and a lower double O-ring sealing portion 190. There is a bypass adjuster for all of the eight bypass zones including the C1, C2, C3, R1, R2, HSR, FB and HSC zones.

Figure 16:
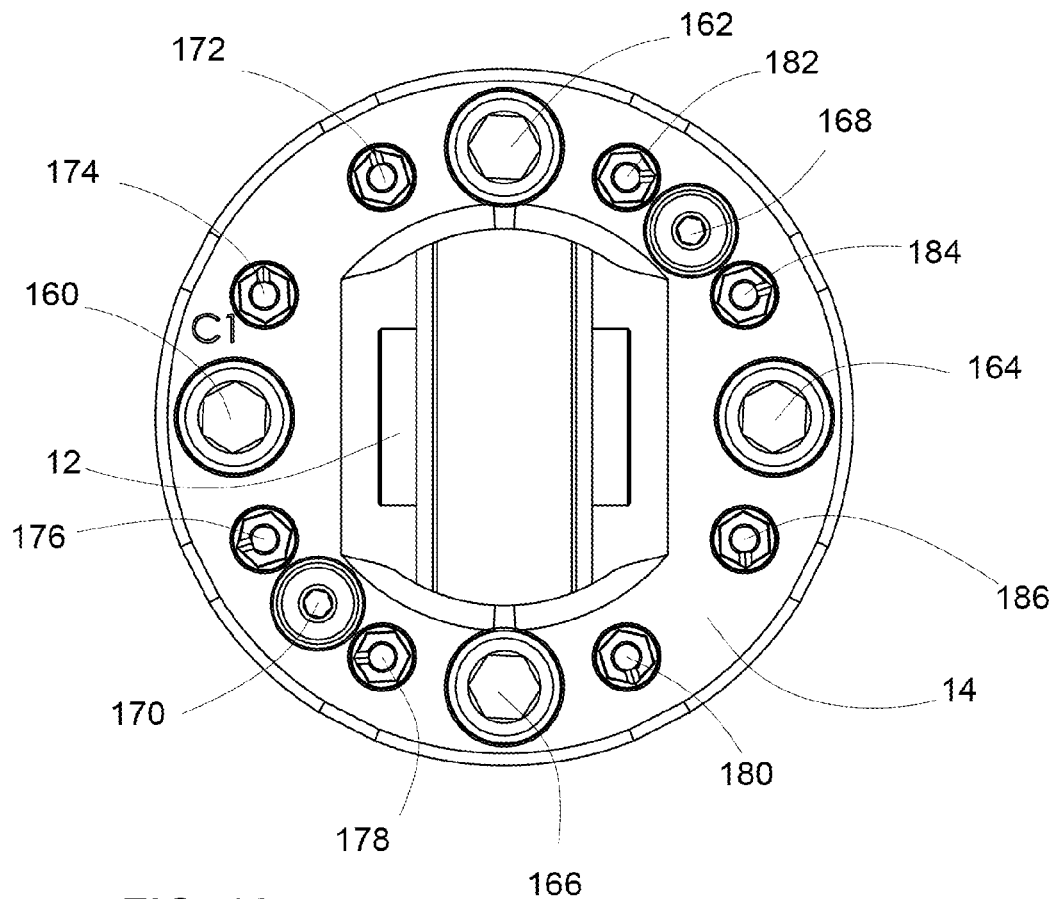
FIG. 16 depicts a top plan view of the top cap assembly illustrating the positions of the top cap bolts, the bypass adjusters and the bleed screws.

FIG. 16 depicts a top plan view of the top cap assembly 12 again illustrating the top cap housing 14, the four top cap retaining bolts 160, 162, 164 and 166, the two shock bleed screws 168 and 170, and the bypass adjuster accepting orifices within the top cap housing 14. The bypass adjusters 172, 174, 176, 178, 180, 182, 184 and 186 each include a body portion 188, a top bolt portion 192 and a lower double O-ring sealing portion 190. There is a bypass adjuster for all of the eight bypass zones including the C1, C2, C3, R1, R2, HSR, FB and HSC zones. Going clockwise from the 9 o'clock position there is seen a retaining bolt 160, the C1 adjuster 174, the C2 adjuster 172, a retaining bolt 162, the C3 adjuster 182, a bleed screw 168, the R1 adjuster 184, a retaining bolt 164, the R2 adjuster 186, the high-speed rebound (HSR) adjuster 180, a retaining bolt 166 and the free bleed (FB) adjuster 178, a bleed screw 170 and the high-speed compression (HSC) adjuster 176.

Figure 17:
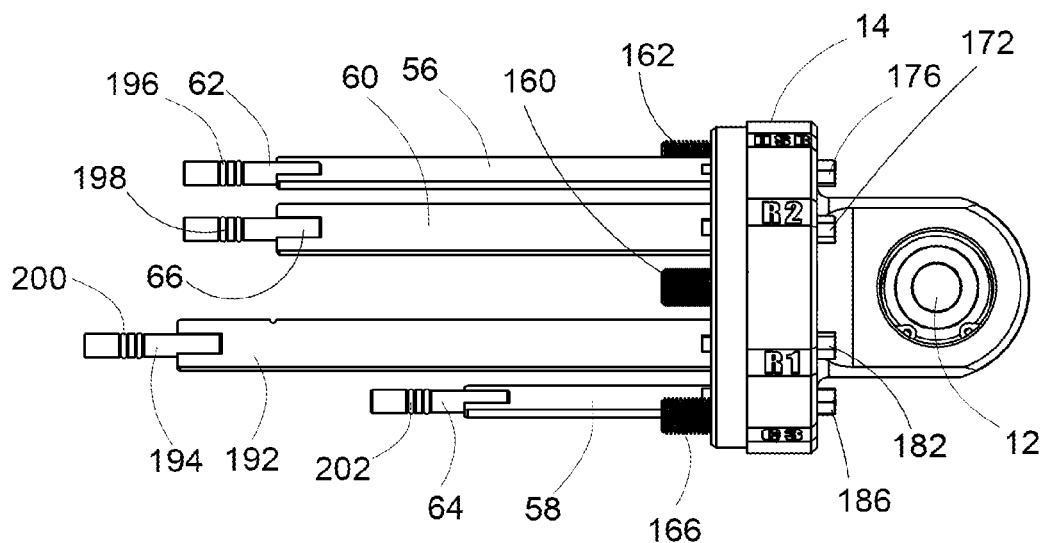
FIG. 17 depicts a side elevational view of the top cap assembly with adjuster rods installed.

FIG. 17 depicts a side elevational view of the top cap assembly 12 with adjuster rods installed within the top cap 14. The lower threaded portion of the top cap retaining bolts 160, 162 (partially seen) and 166 is seen, while the lower threaded portion of retaining bolt 164 is obstructed in this view and not seen. Adjusters 172, 176, 182 and 186 extend through the top cap frame 14 and connect to the upper portion of adjuster plates 60, 56, 192 and 58, respectively. In turn, each of the adjuster plates 60, 56, 192 and 58 connect to adjuster rod pistons 66, 62, 194 and 64, respectively. These adjuster rod pistons 66, 62, 194 and 64 include a double O-ring seal 196, 198, 200 and 202 on their shafts.

Figure 18:
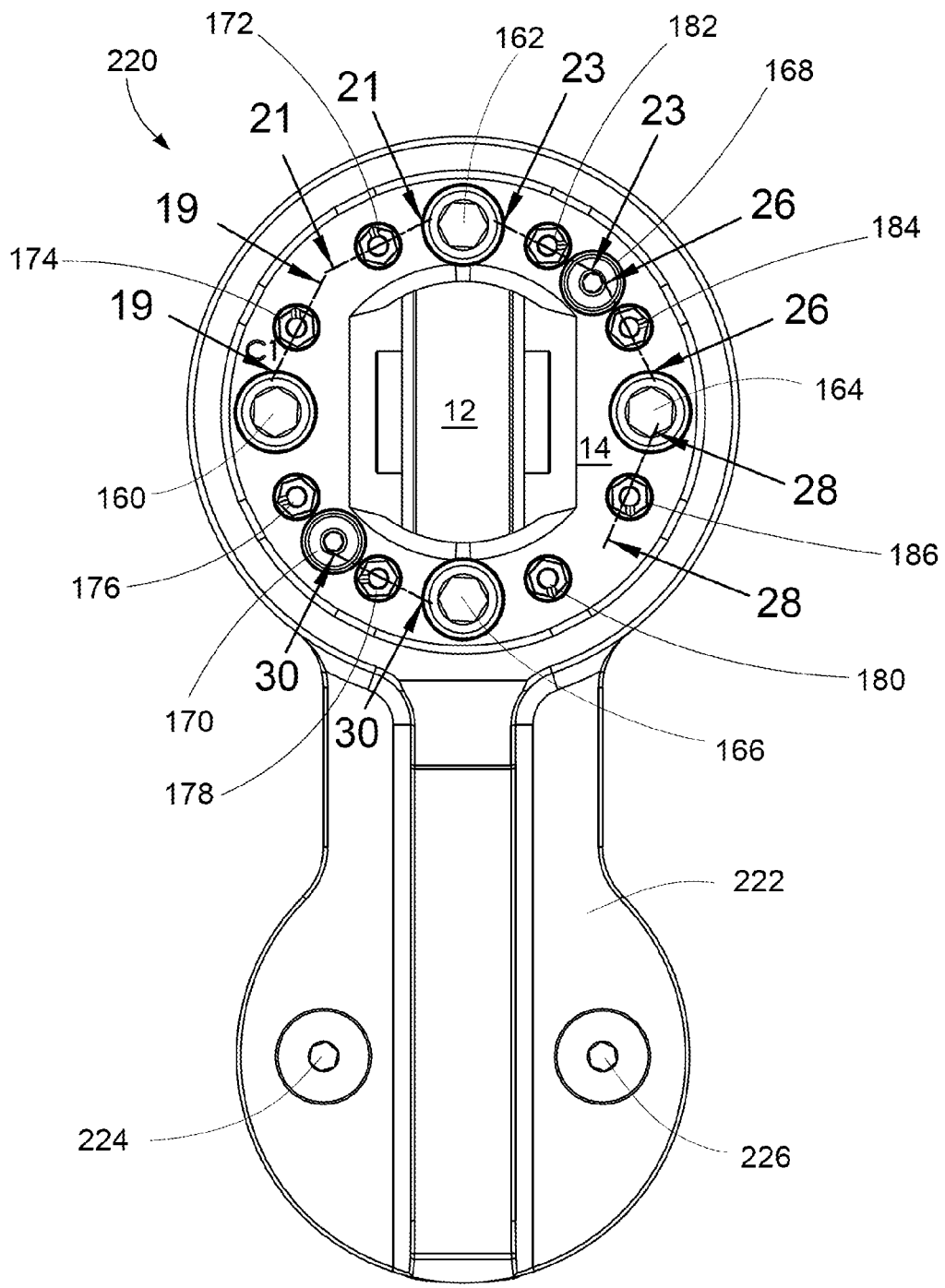
FIG. 18 depicts a top plan view of the top cap assembly with a piggyback reservoir and the reservoir manifold section.

FIG. 18 depicts a top plan view of the top cap assembly installed with a piggyback reservoir 220 illustrating the position and location of the reservoir manifold section 222 in relation to the top cap assembly 12. Again, this top plan view shows the four top cap retaining bolts 160, 162, 164 and 166, the two shock bleed screws 168 and 170, and the bypass adjuster accepting orifices within the top cap 14. The bypass adjusters 172, 174, 176, 178, 180, 182, 184 and 186 each include a body portion 188, a top bolt portion 192 and a lower double O-ring scaling portion 190. There is a bypass adjuster for all of the eight bypass zones including the C1. C2, C3, R1, R2, HSR, FB and HSC zones. The reservoir is not seen in this top plan view however, the reservoir retaining bolts 224 and 226 are shown. This top plan view in FIG. 18 will also orient the following cross-sectional views in FIGS. 19, 21, 23, 26, 28 and 30 (see below) to show detail of what lies below each of the bypass adjusters 174, 172, 182, 184, 186 and 178, respectively, as seen here in a clockwise configuration. Again, as in FIG. 16 moving clockwise from the 9 o'clock position there is seen a retaining bolt 160, the C1 adjuster 174, the C2 adjuster 172, a retaining bolt 162, the C3 adjuster 182, a bleed screw 168, the R1 adjuster 184, a retaining bolt 164, the R2 adjuster 186 the high-speed rebound (HSR) adjuster 180, a retaining bolt 166 and the free bleed (FB) adjuster 178, a bleed screw 170 and the high-speed compression (HSC) adjuster 176.

FIG. 19 depicts a cross-sectional view 230 of what lies below the top cap assembly 12 and top cap 14 at the compression bypass zone 1 (C1) adjuster 174 as shown in FIG. 18, shown in a high-speed configuration with both check valves open. Below the C1 adjuster 174 is seen an upper threaded connector portion 232, an adjuster plate 234, a lower connection portion 236, an adjuster block 238 having a pair of bypass tubes 240 and 242 extending downwardly from the adjuster block 238. The two bypass tubes 240 and 242 connect to a lower bypass check valve housing inside the lower bulkhead 78 and assembly outer body 244. In operation, rotation of the adjuster 174 causes threaded portion 232 and adjuster plate 234 to move upwardly contracting or downwardly extending which in turn moves the lower connection metering valve 236 to open or close the oil flow port opening 237. In this way, the first compression bypass zone 1 (C1) of the shock absorber is tuned by adjusting the oil flow port opening size.

FIG. 20 depicts a cross-sectional close-up detailed view of the lower check valve housing inside the lower bulkhead 78 and assembly 244 of C1, as illustrated in FIG. 19. Bypass tubes 240 and 242 attach to the lower bulkhead 78 at the upper portion where two bypass oil ports represented by 246 are seen having a compression check valve 248 and compression check valve spring 249. Here, as seen in this FIG. 20, both compression check valves as represented by 248 are open allowing the flow of oil through the bypass ports as represented by 246.

FIG. 21 depicts a cross-sectional view 250 of what lies below the top cap assembly 12 and top cap 14 at the compression bypass zone 2 (C2) adjuster 172 of the compression bypass zone 2 (C2) as shown in FIG. 18, shown in a low-speed configuration with only one check valve open. Below the C2 adjuster 172 is seen an upper threaded connector portion 252, an adjuster plate 254, a lower connection portion 256, an adjuster block 258 having a pair of bypass tubes 260 and 262 extending downwardly from the adjuster block 258. The two bypass tubes 260 and 262 connect to a lower bypass check valve housing inside the lower bulkhead 78 and assembly outer body 264. In operation, rotation of the adjuster 172 causes threaded portion 252 and adjuster plate 254 to move upwardly contracting or downwardly extending which in turn moves the lower connection metering valve 256 to open or close the oil flow port opening 257. In this way, the second compression bypass zone 2 (C2) of the shock absorber is tuned through adjustment of the oil flow port opening size.

FIG. 22 depicts a cross-sectional close-up detailed view of the lower check valve housing inside the lower bulkhead 78 and assembly 264 of C2, as illustrated in FIG. 21 shown in a low-speed configuration. Bypass tubes 260 and 262 attach to the lower bulkhead 78 at the upper portion where two bypass oil ports represented by 266 are located with only one seen here, having two compression check valves 267 and 268 and compression check valve spring 269. Here, as seen in this FIG. 22, one compression check valve as represented by 267 is open allowing the flow of oil through the bypass ports as represented by 266. The other compression check valve 268 is in the closed position with check valve spring 269 being fully extended such that the check valve 268 covers the oil flow port (not seen) preventing oil flow.

Figures 23, 24, 25, 26, 27:
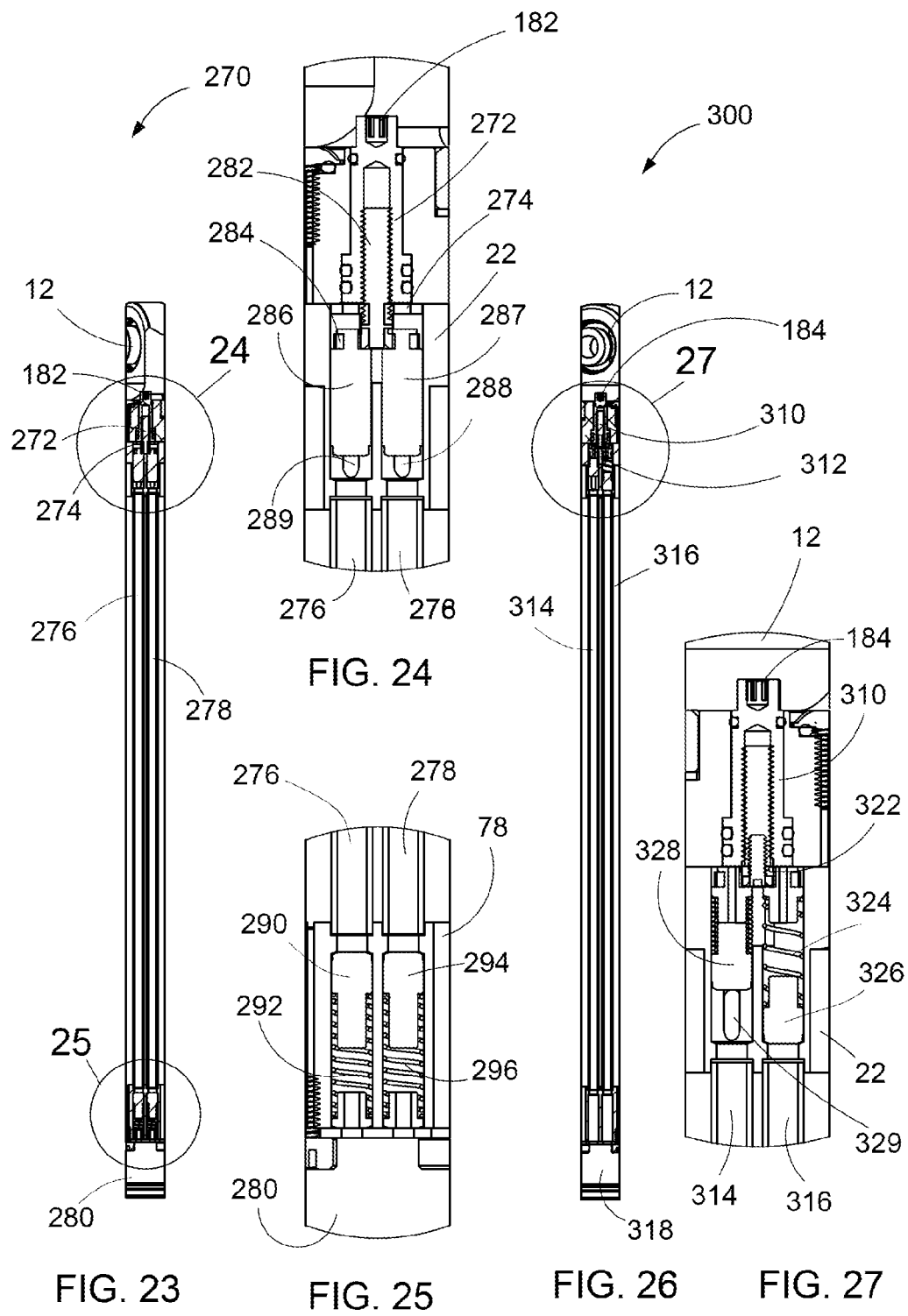
FIG. 23 depicts a cross-sectional view of the compression bypass zone 3 (C3) as shown in FIG. 18.
FIG. 24 depicts a cross-sectional close-up detailed view of the upper adjuster valve housing of C3, as illustrated in FIG. 23 shown in a partially closed position.
FIG. 25 depicts a cross-sectional close-up detailed view of the lower check valve housing of C3, as illustrated in FIG. 23.
FIG. 26 depicts a cross-sectional view of the rebound bypass zone 1 (R1) as shown in FIG. 18.
FIG. 27 depicts a cross-sectional close-up detailed view of the upper check valve housing of R1, shown in a low-speed configuration, as illustrated in FIG. 26.

FIG. 23 depicts a cross-sectional view 270 of what lies below the top cap assembly 12 and top cap 14 at the compression bypass zone 3 (C3) adjuster 182 as shown in FIG. 18, shown here with an upper adjustable bypass metering valve 274 inside upper bulkhead 22 (see FIG. 24) showing both valves partially open, and a lower check valve housing and assembly outer body 280 with both check valves closed (see FIG. 25). Below the C3 adjuster 182 is seen having an upper threaded connector portion 272, an upper adjustable bypass metering valve 274, a pair of bypass tubes 276 and 278 extending downwardly from the lower connection portion of upper bulkhead 22. The two bypass tubes 276 and 278 connect to a lower bypass check valve housing inside lower bulkhead 78 and assembly outer body 280.

FIG. 24 depicts a cross-sectional close-up detailed view of the upper adjustable bypass metering valve 274 of C3, as illustrated in FIG. 23. Below C3 Adjuster 182 is seen a threaded bypass rod 282 and an adjuster plate 284. The bypass valve adjuster plate 284 moves up and down as the threaded rod 272 is extended or retracted, moving the two compression valves 286 and 287 which in turn either opens or closes the oil flow ports 288 and 289. When in a partially open position (as seen here) oil is allowed to flow through ports 288 and 289 into bypass tubes 276 and 278, respectively. In operation, rotation of the adjuster 182 causes threaded portion 282 to move upwardly contracting or downwardly extending which in turn moves the metering valves 286 and 287 to open or close the oil flow port openings 288 and 289. In this way, the third compression bypass zone 3 (C3) of the shock absorber is tuned through adjustment of the oil flow port opening size.

FIG. 25 depicts a cross-sectional close-up detailed view of the lower check valve housing and assembly 270 of C3, as illustrated in FIG. 23. Bypass tubes 276 and 278 attach to the upper portion of lower bulkhead 78 where two bypass oil ports are located with none seen here, having two compression check valves 290 and 294 and compression check valve springs 292 and 296. Here, as seen in this FIG. 25, both compression check valves 290 and 294 are closed preventing the flow of oil through the bypass ports (not seen).

FIG. 26 depicts a cross-sectional view 300 of what lies below the top cap assembly 12 and top cap 14 at the rebound bypass zone 1 (R1) adjuster 184 as shown in FIG. 18, shown here with a threaded rod 310 and an upper adjustable bypass metering valve 312 (see FIG. 27) showing the R1 zone in a low-speed configuration with only one bypass check valve open.

FIG. 27 depicts a cross-sectional close-up detailed view of the upper check valve inside upper bulkhead 22, as illustrated in FIG. 26. R1 Adjuster 184 is illustrated having a threaded bypass rod 310 and an adjuster plate 322. The bypass valve adjuster plate 322 moves up and down as the threaded rod 310 is extended or retracted putting pressure on, and limiting travel of, the two rebound check valves 326 and 328 which in turn either increases or decreases oil flow as represented by 329. When rebound check valve 328 is in the open position (as seen here) oil is allowed to flow through ports 329 into bypass tube 314. Rebound check valve 326 is in the closed position with check valve spring 324 fully extended, and in this closed position prevents oil flow. In this way, the first rebound bypass zone 1 (R1) of the shock absorber is tuned.

FIG. 28 depicts a cross-sectional view 330 of what lies below the top cap assembly 12 and top cap 14 at the rebound bypass zone 2 (R2) adjuster 186 as shown in FIG. 18, shown in a low-speed configuration with only one check valve open. Below the R2 adjuster 186 is seen an upper threaded connector portion 332, an adjuster plate connection portion 334, an adjuster plate 336, a lower connection portion 338, an adjuster block 339 having a pair of bypass tubes 342 and 344 extending downwardly from the adjuster block 339. The two bypass tubes 342 and 344 connect to a lower bypass check valve housing inside lower bulkhead 78 and assembly outer body 346. In operation, rotation of the adjuster 186 causes threaded portion 332 and adjuster plate 336 to move upwardly contracting or downwardly extending which in turn moves the lower connection metering valve 338 to open or close the oil flow port opening 340. In this way, the second rebound bypass zone 2 (R2) of the shock absorber is tuned through adjustment of the oil flow port opening size.

FIG. 29 depicts a cross-sectional close-up detailed view of the lower check valve housing of R2, as illustrated in FIG. 28, here illustrating the oil flow direction within the check valve with flow direction arrows. As seen here, the lower bypass check valve housing inside lower bulkhead 78 and assembly outer body 346 is located at the lower end of twin bypass tubes 342 and 344. The lower bypass check valve housing inside lower bulkhead 78 and assembly outer body 346 includes check valves 350 and 354 having check valve spring 348 and check valve seat 352, respectively. Bypass check valve 354 is in the open position, while check valve 350 is in the closed position. In operation, open check valve 354 allows oil to flow upwardly and into bypass tubes 342 and 344. Closed check valve 350 prevents the flow of oil into bypass tubes 342 and 344.

FIG. 30 depicts a cross-sectional view 360 of what lies below the top cap assembly 12 and top cap 14 at the free-bleed zone (FB) adjuster 178 as shown in FIG. 18. Here there is an adjustable bypass metering valve only as there is no check valve in the FB zone as it works in both the compression and rebound cycles. Below the FB adjuster 178 is seen an upper threaded connector portion 364, an adjuster plate connection portion 362, and a pair of bypass tubes 366 and 368 extending downwardly from the adjuster plate connection portion 362. The two bypass tubes 366 and 368 connect to a lower oil port housing inside lower bulkhead 78 and assembly outer body 370.

FIG. 31 depicts a cross-sectional close-up detailed view of the upper valve housing of FB, inside upper bulkhead 22 as illustrated in FIG. 30. Here there is seen the FB adjuster 178 and a threaded portion 364 as well as a connector plate 362 attached to two metering valves 372 and 376 which open and close relative to two oil flow ports 374 and 378, respectively. In operation, rotation of the adjuster 178 causes threaded portion 364 to move upwardly contracting or downwardly extending which in turn moves the metering valves 372 and 376 to open or close the oil flow port openings 374 and 378. In this way, the free-bleed (FB) zone of the shock absorber is tuned through adjustment of the oil flow port opening size.

FIG. 32 depicts a cross-sectional close-up detailed view of the lower bulkhead 78 and assembly outer body 370 of the FB zone, as illustrated in FIG. 30. Bypass tubes 366 and 368 terminate at the lower end within the lower bulkhead 78. Oil ports 380 and 382 remain totally unobstructed and thereby allow the free flow or bleed of oil within the lower oil port housing 370. Therefore, all of the adjustment control of the FB zone lies in the upper bulkhead 22 housing the two metering valves 372 and 376 (see FIG. 30 and FIG. 31).

FIG. 33 depicts a detailed bottom perspective view of a single bypass adjuster 400. The adjuster 400 is seen having an adjuster bolt portion 410, an adjuster shaft 412, an internally threaded hollow center portion 414 and a double O-ring seal portion including O-ring seal grooves 415 and 417 which are configured to accept O-rings (not shown, see FIG. 35).

FIG. 34 depicts a detailed side elevational view of a bypass adjuster plate 422 having an externally threaded rod upper portion 420 and a lower connection portion 424 having a double O-ring seal portion including O-rings 426 and 427 above a lower rod portion 428.

FIG. 35 depicts a single assembled bypass adjuster assembly 400 including a bypass adjustment bolt portion 410 as shown in FIG. 33 threaded onto the upper threaded rod portion 420 of bypass adjuster plate 422 and sealed lower rod portion 428 with O-rings 426 and 427 as shown in FIG. 34. Bypass adjuster assembly 400 includes the bypass adjustment bolt portion 410 which includes O-rings 416 and 418 which are located within O-ring grooves 415 and 417 as seen in FIG. 33.

Figure 36:
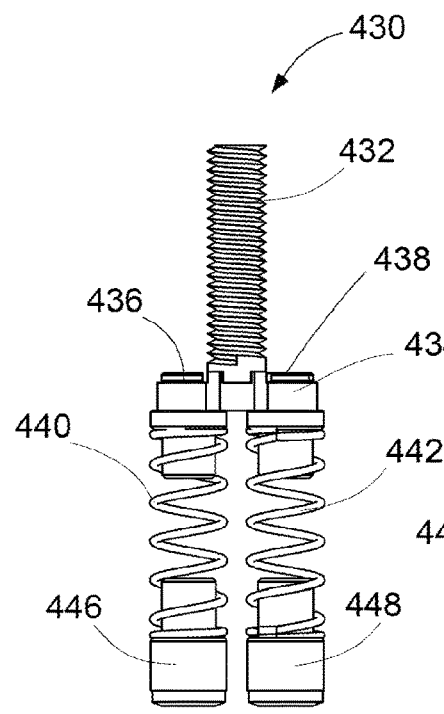
FIG. 36 depicts a rebound check valve shown in the closed position.

FIG. 36 depicts a rebound check valve 430 shown in the closed position. Rebound check valve 430 includes an upper threaded rod portion 432, and upper valve spring retaining plate 434 having two valve seats 436 and 438. Below the check valve seats 436 and 438 are check valve springs 440 and 442, respectively. At the bottom end of each check valve spring 440 and 442 is a check valve piston 446 and 448, respectively.

Figure 37:
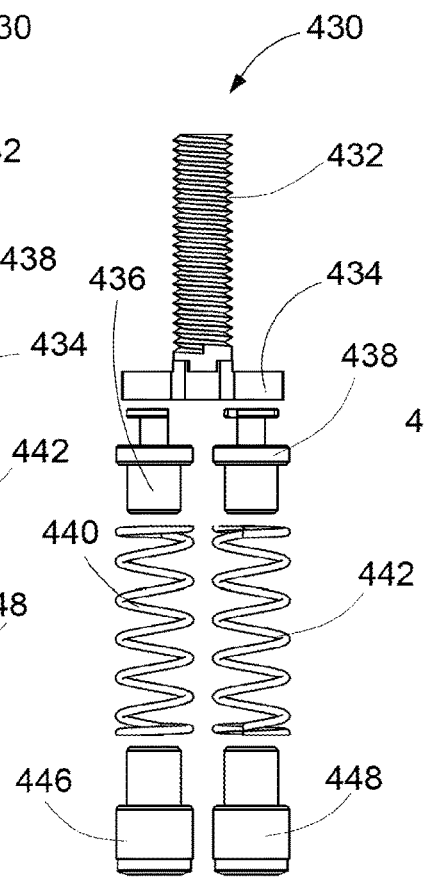
FIG. 37 depicts an exploded view of the rebound check valve as shown in FIG. 36.

FIG. 37 depicts an exploded view of the rebound check valve 430 shown in the closed position as seen in FIG. 36. Rebound check valve 430 includes an upper threaded rod portion 432, and upper valve spring retaining plate 434 having two valve seats 436 and 438. Below the check valve seats 436 and 438 are check valve springs 440 and 442, respectively. At the bottom end of each check valve spring 440 and 442 is a check valve piston 446 and 448, respectively.

Figure 38:
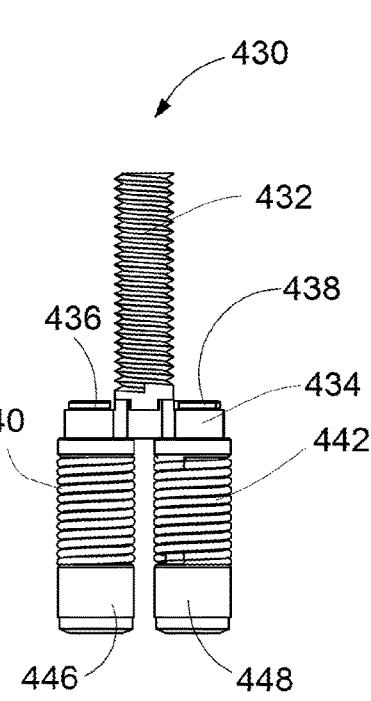
FIG. 38 depicts a rebound check valve shown in the open position.

FIG. 38 depicts a rebound check valve 430 shown in the open position. Here, the check valve springs 440 and 442 spanning between the two valve seats 436 and 438 and valve pistons 446 and 448 are completely compressed. When in this position, the valve pistons create an opening to the oil flow ports (not seen) and thereby, allow oil to flow and bypass the shaft piston (not seen here), hence the "open" position.

Figure 39:
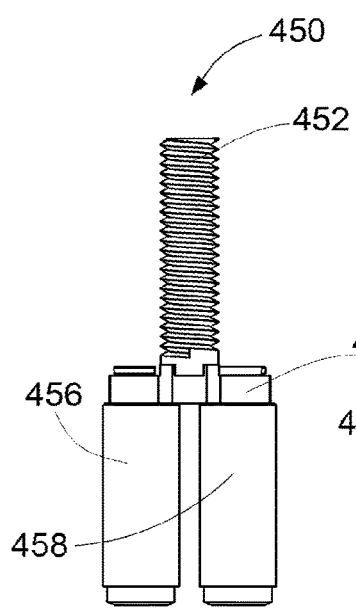
FIG. 39 depicts an adjustable bypass metering valve used for bump zone and free bleed applications.

FIG. 39 depicts an adjustable bypass metering valve 450 used for bump zone and free bleed applications. The bypass metering valve 450 includes an upper threaded rod portion 452, and adjustable valve plate 454 and two metering valve pistons 456 and 458.

Figure 40:
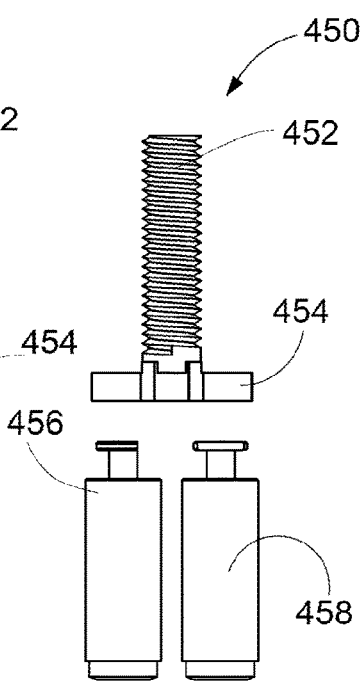
FIG. 40 depicts a partially disassembled adjustable bypass metering valve used for bump zone and free bleed applications, as shown in FIG. 39.

FIG. 40 depicts a partially disassembled adjustable bypass metering valve 450 used for bump zone and free bleed applications, as shown in FIG. 39. As shown, here the two metering valve pistons 456 and 458 are detached from the adjustable valve plate 454 which lies at the bottom section of the upper threaded rod portion 452.

Figure 41:
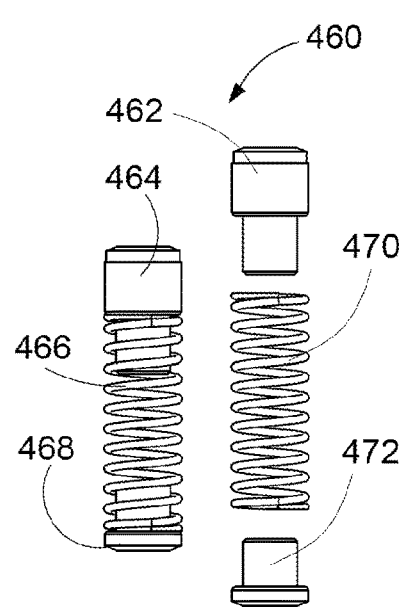
FIG. 41 depicts an assembled (on the left) and disassembled (on the right) check valve piston, check valve spring and check valve seat members.

FIG. 41 depicts an assembled (on the left) and disassembled (on the right) check valve assembly 460 having two check valve pistons 462 and 464, two check valve springs 466 and 470 and including two check valve seats 468 and 472.

FIG. 42 depicts a compression zone bypass adjuster assembly 480 including an upper threaded rod portion 482, a bypass adjuster plate 484 a lower connection section 486, an adjuster block 488 in the middle, and bypass check valves 494 and 496 located at each of the bypass tubes 490 and 492 lower end shown in a velocity sensitive configuration with differing spring rates on each check valve, whereas one opens and the other remains closed in a low shaft speed situation. As shown, bypass check valve 494 is closed while bypass check valve 496 is in the open position, and when in the open position the check valve allows oil to flow out of the oil flow port 497, around the main piston, back into the inner shock body (not shown). Conversely, when in a closed position, such as check valve 494, the valve piston covers the oil flow port (not seen), and thus prevents oil from flowing around and bypassing the main shaft piston.

FIG. 43 depicts a compression zone bypass adjuster assembly 480 including an upper threaded rod portion 482, a bypass adjuster plate 484 a lower connection section 486, an adjuster block 488 in the middle, and bypass check valves 496 and 498 located at each of the bypass tubes 490 and 492 lower end shown with differing spring rates on each check valve. As shown, in this high shaft speed, velocity sensitive configuration, both bypass check valves 496 and 498 are open, and when in the open position both check valves 496 and 498 allow oil to flow around and bypass the main shaft piston.

FIG. 44 depicts a high-speed compression zone bypass adjuster assembly 500 including an upper threaded rod portion 502, a bypass adjuster plate 504 a lower connection section 506, an adjuster block 508 in the middle, and bypass check valves 514 and 516 located at each of the bypass tubes 510 and 512 lower end shown with firm spring rates on each check valve, whereas both remain closed as shown in a low shaft speed situation preventing oil from bypassing the main shaft piston.

FIG. 45 depicts a high-speed compression zone bypass adjuster assembly 500 including an upper threaded rod portion 502, a bypass adjuster plate 504 a lower connection section 506, an adjuster block 508 in the middle, and a pair of bypass check valves 518 and 519 located at each of the bypass tubes 510 and 512 lower end shown with firm spring rates on each check valve, whereas both remain open in a high shaft speed situation. As shown, both bypass check valves 516 and 518 are open, and when in the open position both check valves 518 and 519 allow oil to flow into the oil flow ports 515 and 517 around the main piston, back into the inner shock body (not shown). As illustrated in FIGS. 44 and 45, these high-speed bypass adjuster assemblies could also be employed as high-speed compression and high speed rebound bypass adjusters. HSC (High Speed Compression) zones and HSR (High Speed Rebound) zones function additionally as sway control valves. They are open when the shock shaft is at higher speeds and work just as any bypass valve does. At lower shaft speeds (when the vehicle is cornering, etc.) they close, not allowing oil to bypass the main shaft piston, and thereby increasing compression and rebound damping, keeping the car more stable. For these valves, the only difference is that the check valve spring rate is increased so the valves function as intended at high speed and close, thereby increasing damping during low shaft speeds.

FIG. 46 depicts an upper rebound zone bypass adjuster assembly 520 including an upper check valve assembly illustrating one valve in the open position and one valve in the closed position in a low shaft speed situation. The upper rebound adjuster assembly 520 includes an upper threaded rod portion 522, a check valve seat securing plate 524, securing two valve seats at the upper end of two valve springs 526 and 530. Two check valve pistons 528 and 532 are located at the lower end of valve springs 526 and 530, respectively. Below the upper rebound zone bypass adjuster assembly 520 are bypass tubes 534 and 536 which at the lower end are connected to a single bypass block 538. Here, the valve piston 528 is in the closed position and covers the oil flow port below it and thereby prevents oil from flowing out of bypass tube 534. Valve piston 532 is in the open position, above oil port 533, and when in the open position allows oil to flow out of bypass tube 536 and around the shaft piston (not shown). By adjusting the upper rebound zone bypass adjuster assembly 520 the spring rate is increased or decreased as well as the travel of valve piston 528 and 532. Here illustrated with differing spring rates on each check valve, in a velocity sensitive configuration, whereas one opens and the other remains closed in a low shaft speed situation.

FIG. 47 depicts an upper rebound zone bypass adjuster assembly 520 including an upper check valve assembly illustrating both valves in the open position in a high shaft speed situation. Again, the upper rebound adjuster assembly 520 includes an upper threaded rod portion 522, a check valve seat securing plate 524, securing two valve seats at the upper end of two valve springs 540 and 530. Two check valve pistons 542 and 532 are located at the lower end of valve springs 540 and 530, respectively. Below the upper rebound zone bypass adjuster assembly 520 are bypass tubes 534 and 536 which at the lower end are connected to a single bypass block 538. Here, the valve piston 542 and 532 are in the open position and expose the two oil flow ports 535 and 533 below it and thereby allows oil to flow from the bypass tubes 534 and 536, around the shaft piston, back into the inner shock body (not shown). By adjusting the upper rebound zone bypass adjuster assembly 520 the spring rate is increased or decreased as well as the travel of valve piston to vary the amount of oil to freely flow out of the bypass tubes and around the main shaft piston.

FIG. 48 depicts a lower rebound zone bypass adjuster assembly 550 including a bypass adjuster plate at the top, an adjuster block in the middle, and a pair of bypass tubes having bypass check valves located at each tubes lower end illustrating one valve in the open position and one valve in the closed position in a low shaft speed situation. The lower rebound zone bypass adjuster assembly 550 includes an upper threaded rod portion 552, an adjuster plate 554, a lower adjuster plate connection section 556 which connects the adjuster plate 554 with an adjuster block 558. Two bypass tubes 560 and 562 attach to the adjuster block 558 lower end and extend down to two check valves 564 and 566. As illustrated here, check valve 564 is in the open position and opens upwardly exposing oil flow port 565 and thereby allowing oil to flow into bypass tube 560. On the other hand, check valve 566 is in the closed position, having valve piston 568 covering its associated oil flow port (not seen), thereby preventing the flow of oil into bypass tube 562 and around the main shaft piston. This adjusted lower rebound zone bypass adjuster assembly 550, shown with differing spring rates having one check valve 564 open and one check valve 568 closed facilitates low shaft speed shock piston rebounding.

FIG. 49 depicts a lower rebound zone bypass adjuster assembly 550 including a bypass adjuster plate at the top, an adjuster block in the middle, and a pair of bypass tubes having bypass check valves located within each tubes lower end illustrating both valves in the open position in a high shaft speed situation. The lower rebound zone bypass adjuster assembly 550 includes an upper threaded rod portion 552, an adjuster plate 554, a lower adjuster plate connection section 556 which connects the adjuster plate 554 with an adjuster block 558. Two bypass tubes 560 and 562 attach to the adjuster block 558 lower end and extend down to two check valves 564 and 566. As illustrated here, check valve 564 and 566 are both in the open position, here with valve piston 569 raised, exposing oil flow ports 565 and 567 and thereby allowing oil to flow into both bypass tubes 560 and 562. This adjusted lower rebound zone bypass adjuster assembly 550 having both check valves 564 and 566 open facilitates high shaft speed shock piston tuning in the rebound cycle.

FIG. 50 depicts a bottom plan view of an empty (disassembled) bypass adjuster block 570. The bypass adjuster block housing 572 has two bypass tube accepting orifices 574 and 576 for accepting insertion of the bypass tubes.

FIG. 51 depicts a cross-sectional view of the empty (disassembled) bypass adjuster block 570 as shown in FIG. 50. This cross-sectional view looks to the bottom of the bypass adjuster block 572 and illustrates the oil flow orifice 579 as well as the upper orifice 582 therein. Orifice 578 is merely a window used for part machining purposes and it serves no purpose other than for manufacturing.

FIG. 52 depicts a bottom and rear perspective view of the empty (disassembled) bypass adjuster block 572 showing the oil flow orifice 579 as well as the two bypass tube accepting orifices 574 and 576 as shown in FIG. 50 and FIG. 51.

FIG. 53 depicts a top view of the empty (disassembled) bypass adjuster block 572 as shown in FIG. 50. In this view, the upper orifice 582 is visible as are the two bypass tube accepting orifices 574 and 576.

FIG. 54 depicts a bottom and rear perspective view of an alternative, single bypass tube empty (disassembled) bypass adjuster block housing 571, as shown in FIG. 55 (Below). Here, a single bypass tube accepting orifice 582 and oil flow orifice 579 are clearly shown.

FIG. 55 depicts a compression zone bypass adjuster assembly 580 including an upper threaded rod portion 584, a bypass adjuster plate 585 a lower connection section 586, a bypass adjuster block 571 in the middle, and a single bypass check valve 589 located at the bypass tube 572 lower end shown. In operation, bypass oil flow is regulated by the opening and closing of the adjuster rod end 586 housed within the bypass adjuster block 571 and oil flows from the main shock piston body through orifice 581 and into the bypass tube accepting orifice 582 and through bypass tube 572 which compresses check valve 589 (as shown) allowing oil through bypass port 588 and around the main shaft piston (not shown).

FIG. 56 depicts a top and side elevational perspective view of a check valve retaining plate 590. The check valve retaining plate 590 includes a plurality of orifices as represented by 594 as well as a plurality of carved out sections as represented by 592.

FIG. 57 depicts a top plan view of the check valve retaining plate 590 shown in FIG. 56. The check valve retaining plate 590 includes a plurality of orifices as represented by 594 as well as a plurality of carved out sections as represented by 592. Each of these orifices in the check valve retaining plate 590 corresponds to a check valve which is retained by the check valve retaining plate 590. Each of the carved-out sections allows oil to freely flow within the shock body.

FIG. 58 depicts a side elevational view of a fully assembled alternate embodiment bypass adjuster assembly 600, including an upper threaded rod portion 602, a bypass adjuster plate 604, a lower plate connection portion 608 and an orifice block 610 which has a bypass adjuster rod 618 centrally located between a pair of bypass tubes 612 and 614. This is configured for the purpose of adjusting the pair of lower check valves 620 and 622 located at the lower end of each bypass tube 612 and 614, respectively. In this FIG. 58, the two check valves 620 and 622 are in the open position, or a partially open position exposing the oil flow ports 623 and 625. In this open position, the oil flow ports allow oil out of the bypass tubes 612 and 614 and around the main shaft piston. Using this alternate embodiment bypass adjuster assembly 600 the check valve travel and spring rate can be adjusted for high shaft speeds or low shaft speeds, by movement of the adjuster rod 618 or differing spring rates, as required by the type of vehicle and the type of terrain.

FIG. 59 depicts a side elevational view of a fully assembled alternate embodiment bypass adjuster assembly 600, including an upper threaded rod portion 602, a bypass adjuster plate 604, a lower plate connection portion 608 and an orifice block 610 which has a bypass adjuster rod 618 centrally located between the pair of bypass tubes 612 and 614. This is configured for the purpose of adjusting the pair of lower check valves as represented by 624 located at the lower end of each bypass tube 612 and 614, respectively. In this FIG. 59, the two check valves as represented by 624 are in the closed position, with each valve spring fully extended, preventing the flow of oil through the oil flow ports 623 and 625 (not seen). Using this alternate embodiment bypass adjuster assembly 600 the check valve travel and spring rate can be adjusted for high shaft speeds or low shaft speeds, by movement of the adjuster rod 618 and check valve adjuster plate 628 or differing spring rates, as required by the type of vehicle and the type of terrain.

Figure 60:
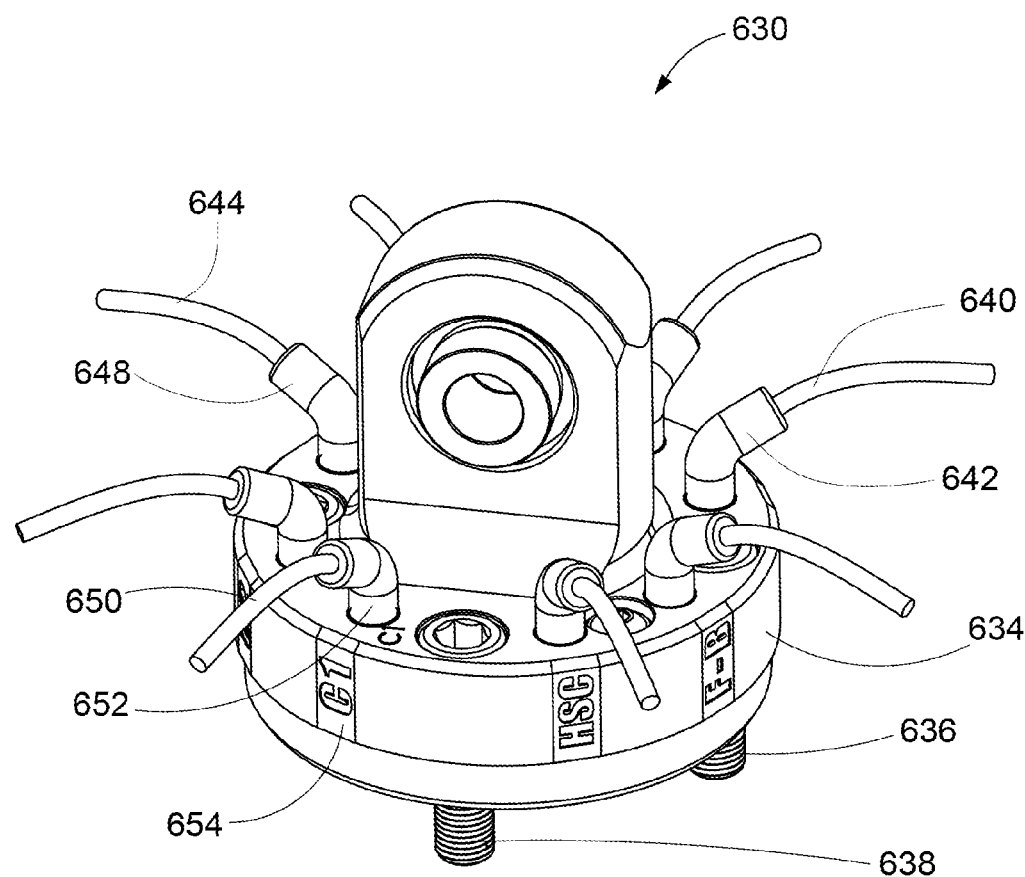
FIG. 60 depicts an upper cap assembly having rotating or linear actuating adjuster cables attached to each bypass adjuster to allow for remote manual bypass adjustment through rotation or linear actuation of each individual adjuster cable.

FIG. 60 depicts an upper cap assembly 630 having rotating or linear actuating adjuster cables attached to each bypass adjuster to allow for manual bypass adjustment through rotation or linear actuation (in and out) of each individual adjuster cable. The upper cap assembly 630 is comprised of the cap 634 and is secured using the retaining bolts as represented by 636 and 638. Each adjuster has an adjuster cable boot cover represented by 642, 648 and 652 which keeps the adjuster cable 640, 644 and 650 in contact with each adjuster. The upper cap is marked 654 with the type of adjuster which is adjacent to each mark. In operation, each adjuster can be rotated to open and close the bypass valves associated with that adjuster. Alternatively, the adjusters can be adjusted by linear, in out, movement of the cable.

Figure 61:
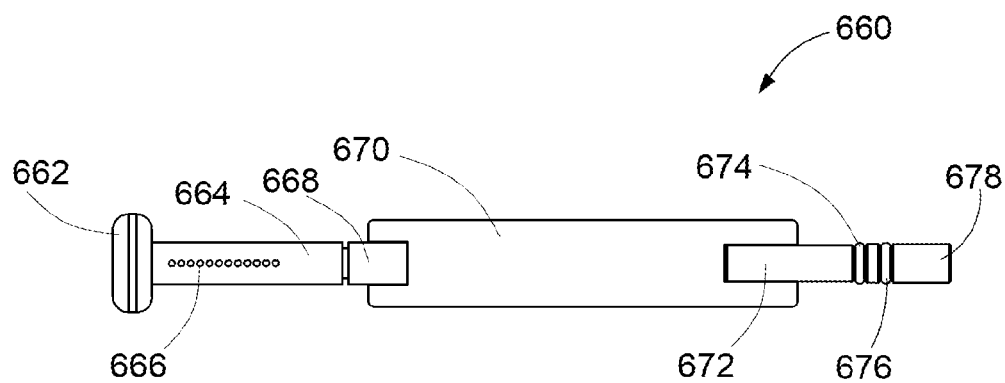
FIG. 61 depicts a linear plunger bypass adjustment mechanism threaded onto the adjuster plate to allow for linear adjustment of bypass valves so equipped.

FIG. 61 depicts a manual linear plunger bypass adjustment mechanism 660 attached to the adjuster plate to allow for linear adjustment of bypass valves so equipped. This manual linear adjustment mechanism 660 includes a bypass adjustment plunger handle 662, a plunger shaft 664 having spaced detents 666. The plunger assembly is connected to the adjuster plate 670 using a connection member 668. At the lower end of the adjuster plate is a connection portion 672 and a double O-ring seal 674 and 676 within the lower rod 678. In operation, a user simply pushes in or pulls out on the plunger thereby adjusting the bypass adjuster up or down to meter fluid which will open or close the bypass check valves (not seen).

FIG. 62 depicts a top cap assembly 680 having an electronic adjuster mechanism attached to two of the adjusters, having the wiring extending laterally away from the electronic adjuster mechanism, to allow for remote electronic adjustment of the bypass shock so equipped. This top cap assembly 680 is comprised of a top cap 682 with markings 686 to identify each adjuster as represented by 683 and 685 located adjacent to each marking 686. Mounted on two adjusters is an electronic housing 688 having two electronic adjuster mechanisms 690 and 692. Each electronic adjuster mechanism has two wires as represented by 694 and 696 on mechanism 692, and 698 and 699 on mechanism 690. These wires are configured to extend laterally away from the shock absorber so equipped. In operation, each adjuster so equipped with an electronic adjustment mechanism can be remotely adjusted via electronic impulses directed to each electronic housing mounted on one or more bypass adjusters.

FIG. 63 depicts a top cap assembly having an alternative embodiment remote electronic adjuster mechanism 700 attached to two of the adjusters, having the wiring extending upwardly away from the electronic adjuster mechanism, to allow for remote electronic adjustment of the bypass shock so equipped. This top cap assembly 700 is comprised of a top cap 702 with markings 706 to identify each adjuster as represented by 710 and 712 located adjacent to each marking 706. Mounted on two adjusters is an electronic housing 708 having two electronic adjuster mechanisms 714 and 716. Each electronic adjuster mechanism has two wires as represented by 713 and 715 on mechanism 714, and 717 and 719 on mechanism 716. These wires are configured to extend upwardly away from the shock absorber so equipped. In operation, each adjuster so equipped with an electronic adjustment mechanism can be remotely adjusted via electronic impulses directed to each electronic housing mounted on one or more bypass adjuster.

FIG. 64 depicts an example of an alternate embodiment extruded shock body 720 as optionally manufactured using extrusion manufacturing techniques instead of the modular shock body construction. When extruded, the shock body 720 comprises an inner piston cavity 722, and a body wall 724. The body wall is extruded to include a plurality of channels to accept bypass valve assemblies and bypass adjusters, as represented by 726, 728, 730 and 732. The purpose of this alternate embodiment extruded shock body 720 is that when using extrusion techniques to manufacture the part, it may be more economical and efficient to generate large numbers of the shock body part for later assembly.

Figure 65:
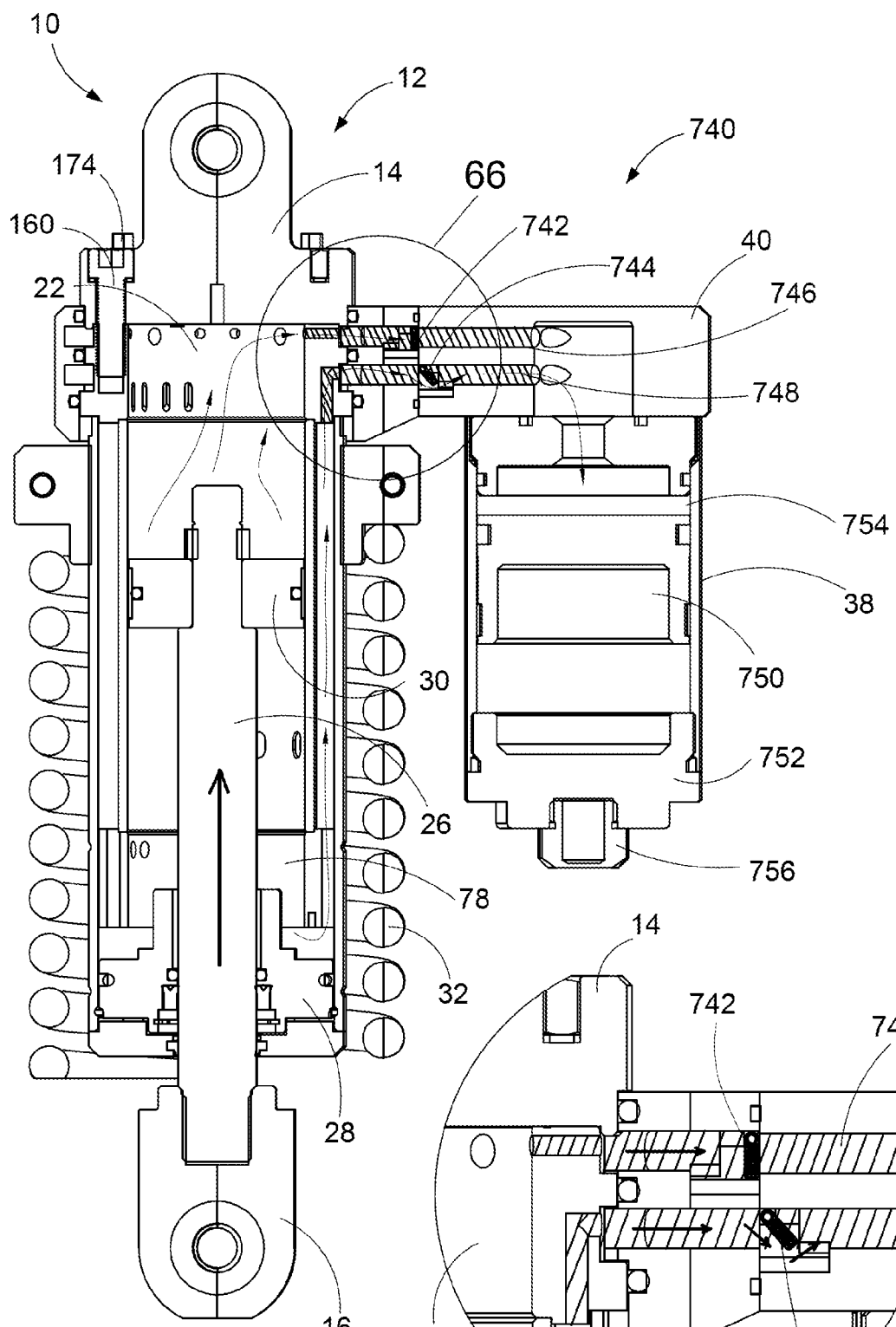
FIG. 65 depicts an externally adjustable internal bypass shock absorber constructed in accordance with the present invention, having a multi check valve in-out reservoir oil flow control configuration, here shown in the compression cycle, whereas oil enters the reservoir from beneath the shaft piston for the purpose of acting in synergy with the bypass adjustments made to the shock itself.

FIG. 65 depicts an externally adjustable internal bypass shock absorber 10 constructed in accordance with the present invention, having a multi check valve in-out reservoir 740 oil flow control configuration, here shown in the compression cycle, oil enters the reservoir from beneath the shaft piston for the purpose of acting in synergy with the bypass adjustments made to the shock itself and not affected by compression forces. The externally adjustable internal bypass shock absorber 10 includes as previously mentioned in FIG. 3, a top cap assembly 12 having a top cap 14, a lower cap 16, an upper bulkhead 22 and a lower bulkhead 78, a piston shaft 26 having a piston 30 at its upper end, and a piston seal body 28, and a coilover spring 32. A reservoir 38 is secured by a reservoir manifold 40 (see FIG. 69 and FIG. 70). Within the reservoir manifold 40 there are two reservoir check valves 742 and 744 located in reservoir oil flow channels, an upper reservoir oil flow channel 746 and a lower reservoir oil flow channel 748. The reservoir includes an air-oil dividing reservoir piston 750, a reservoir cap 752 and a reservoir valve cap 756, and is filled with oil in reservoir void 754. As previously mentioned, this externally adjustable internal bypass shock absorber 10 constructed in accordance with the present invention, having a multi check valve in-out reservoir 740 oil flow control is in the compression cycle. When in the compression cycle, the upper reservoir oil flow channel 746 check valve 742 is closed and the lower reservoir oil flow channel 748 check valve 744 is open. In operation, piston shaft 26 and piston 30 are compressed into the piston cavity and the volume of compressed piston shaft 26 forces an equal volume of oil into reservoir 38 from beneath the shaft piston 30.

Figure 66:
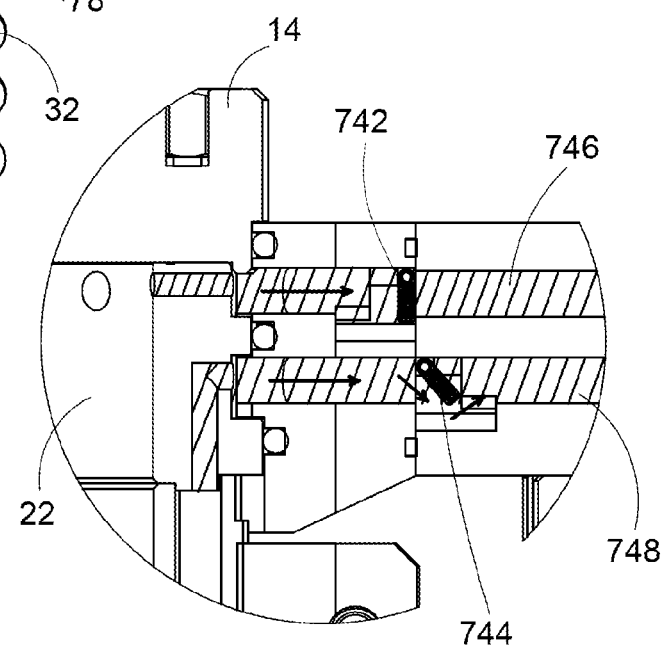
FIG. 66 depicts a close-up detailed view of the two ports within the multi check valve in-out reservoir oil flow control configuration, here shown in the compression cycle, whereas oil enters the reservoir from beneath the shaft piston for the purpose of acting in synergy with the bypass adjustments made to the shock itself.

FIG. 66 depicts a close-up detailed view of the two ports within the multi check valve in-out reservoir 740 oil flow control configuration, as seen in FIG. 65, here shown in the compression cycle, whereas oil enters the reservoir from beneath the shock piston 30 for the purpose of acting in synergy with the bypass adjustments made to the shock itself and not affected by compression forces. In this close-up detailed view, the upper reservoir oil flow channel 746 check valve 742 is closed preventing oil flowing into the reservoir, and the lower reservoir oil flow channel 748 check valve 744 is open allowing oil to flow into the reservoir. This allowing of oil to flow from the piston cavity into the reservoir during compression of the shock, together with the action of the adjusted bypass adjusters acting in synergy, enables full control of the damping of the shock for high and low speeds and high and low vehicle velocities and does not allow compression forces to act on the oil reservoir which in effect can bring the shock to a full hydraulic stop if so adjusted.

Figures 67, 68:
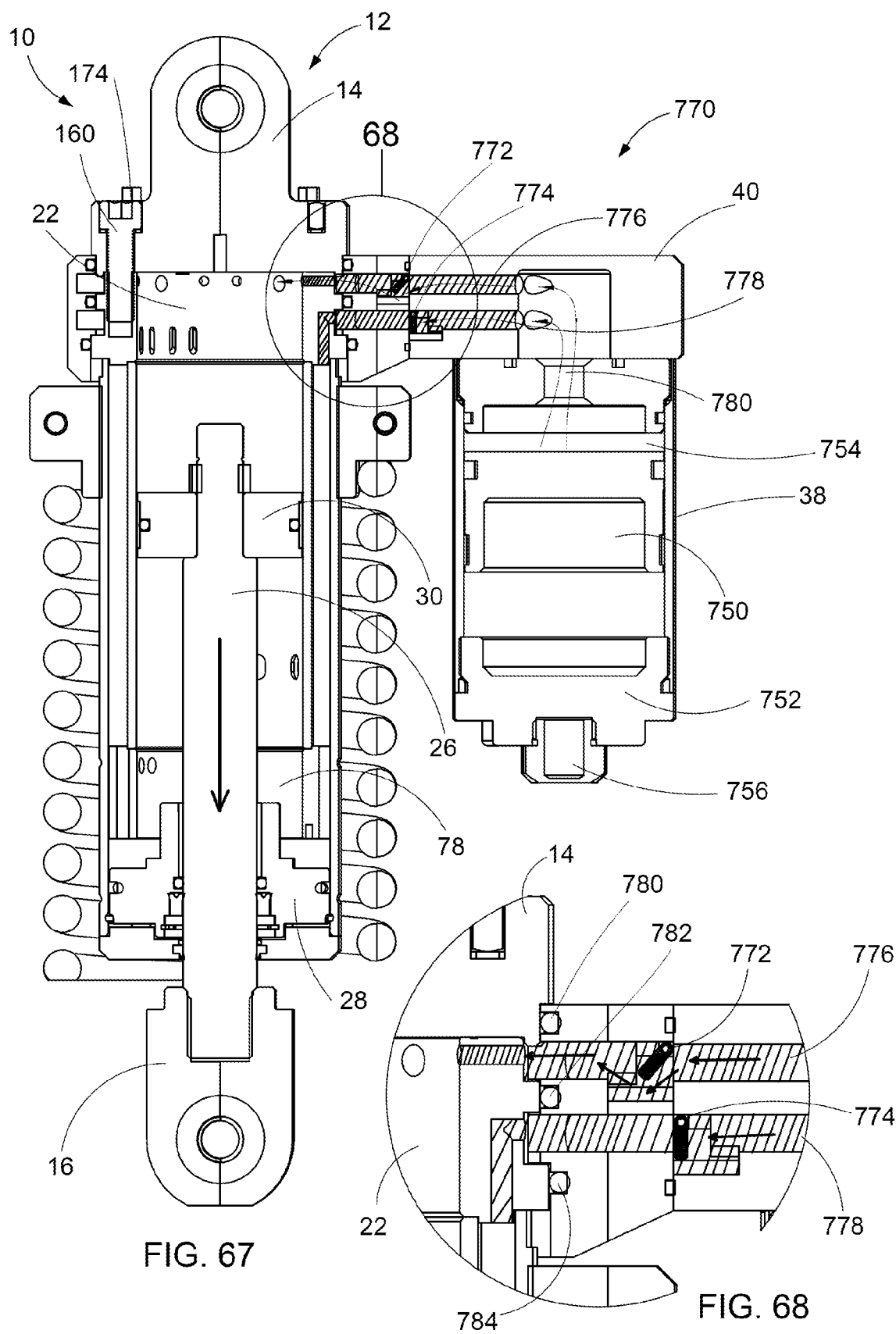
FIG. 67 depicts an externally adjustable internal bypass shock absorber constructed in accordance with the present invention, having a multi check valve in-out reservoir oil flow control configuration, here shown in the rebound cycle, whereas oil returns to the shock body from above the shaft piston for the purpose of acting in synergy with the bypass adjustments made to the shock itself.
FIG. 68 depicts a close-up detailed view of the two ports within the multi check valve in-out reservoir oil flow control configuration, here shown in the rebound cycle, whereas oil returns to the shock body from above the shaft piston for the purpose of acting in synergy with the bypass adjustments made to the shock itself.

FIG. 67 depicts an externally adjustable internal bypass shock absorber 10 constructed in accordance with the present invention, having a multi check valve in-out reservoir 770 oil flow control configuration, here shown in the rebound cycle, whereas oil returns to the shock body from above the shaft piston for the purpose of acting in synergy with the bypass adjustments made to the shock itself and not affected by rebound forces. The externally adjustable internal bypass shock absorber 10 includes as previously mentioned in FIG. 3, a top cap assembly 12 having a top cap 14, a lower cap 16, an upper bulkhead 22 and a lower bulkhead 78, a piston shaft 26 having a piston 30 at its upper end, and a piston seal body 28, and a coilover spring 32. A reservoir 38 is secured by a reservoir manifold 40 (see FIG. 69 and FIG. 70). Within the reservoir manifold 40 there are two reservoir check valves 772 and 774 located in reservoir oil flow channels, an upper reservoir oil flow channel 776 and a lower reservoir oil flow channel 778. The reservoir includes an air-oil dividing reservoir piston 750, a reservoir cap 752 and a reservoir valve cap 756, and is filled with oil in reservoir void 754. As previously mentioned, this externally adjustable internal bypass shock absorber 10 constructed in accordance with the present invention, having a multi check valve in-out reservoir 770 oil flow control is in the rebound cycle. When in the rebound cycle, the upper reservoir oil flow channel 776 check valve 772 is open and the lower reservoir oil flow channel 778 check valve 774 is closed. In operation, piston shaft 26 and piston 30 extend away from the piston cavity and the egress volume of piston shaft 26 is replaced with an equal volume of oil from reservoir 38 from above the shaft piston 30. Oil out to the reservoir during compression comes from beneath the piston and oil back to the shock body comes from above. This effectively eliminates compression and rebound forces and pressure from affecting the reservoir, which in turn, effectively eliminates cavitation and vacuum effects inside the shock.

FIG. 68 depicts a close-up detailed view of the two ports within the multi check valve in-out reservoir 770 oil flow control configuration, as seen in FIG. 67, here shown in the rebound cycle, whereas oil returns above the shock piston 30 within the shock piston cavity from the reservoir 38 for the purpose of acting in synergy with the bypass adjustments made to the shock itself and not affected by rebound forces. In this close-up detailed view, the upper reservoir oil flow channel 776 check valve 772 is open allowing oil to flow from the reservoir and into the shock body, and the lower reservoir oil flow channel 778 check valve 774 is closed preventing oil flowing from the reservoir back into the shock body. In this view, the three O-ring seals 780, 782 and 784 are seen located within reservoir manifold 40 (see detail in FIG. 69 below). This allowing of oil to flow from the reservoir into the piston cavity from above the piston during rebound of the shock, together with the action of the adjusted bypass adjusters acting in synergy, enables full control of the damping of the shock for high and low speeds and high and low vehicle velocities and the reservoir to be unaffected by rebound forces.

Figure 69:
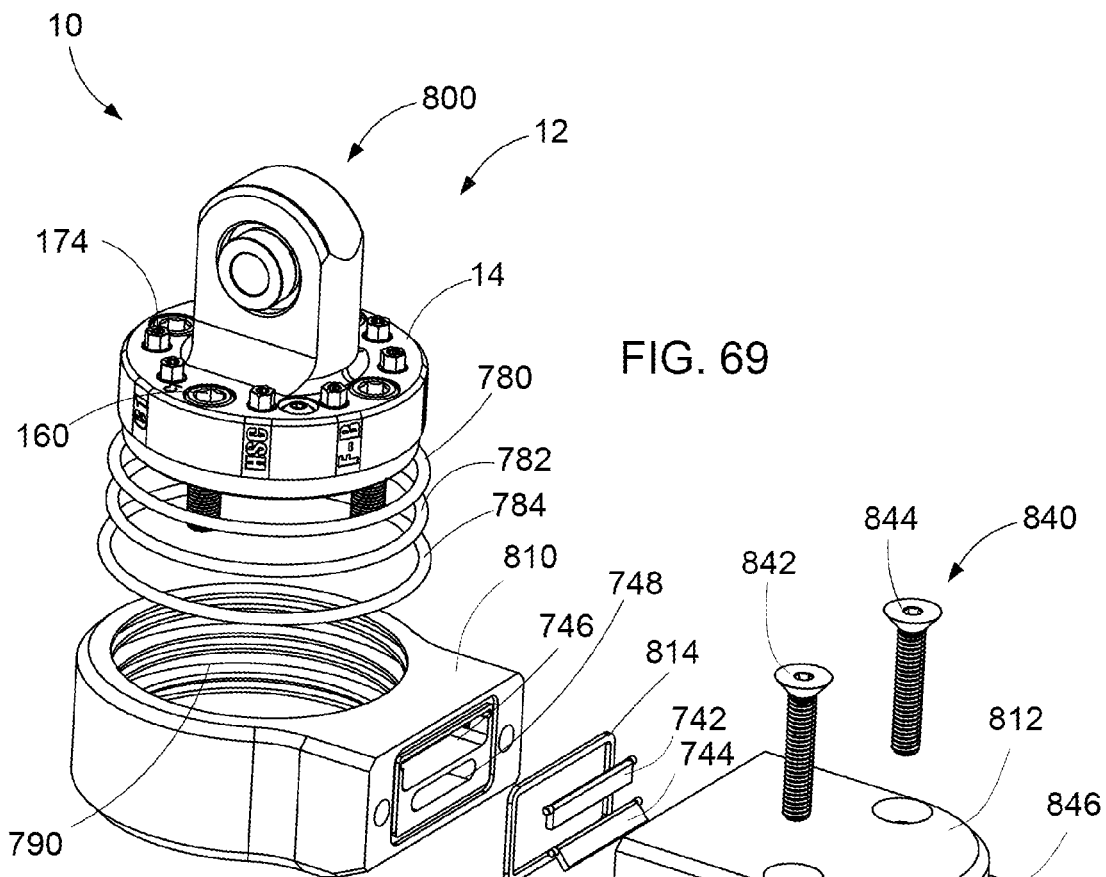
FIG. 69 depicts an exploded partial top perspective view of the top cap and reservoir manifold assembly.

FIG. 69 depicts an exploded partial top perspective view of the top cap assembly 12 and two-piece reservoir manifold assembly 800 above the upper bulkhead 22 of the shock body (not seen). The top cap assembly 12 shows the top cap 14 and a retaining screw 160 as well as a representative adjuster 174. The top cap side of the two-piece reservoir manifold 810 is located directly below the top cap assembly 12 and when the upper bulkhead is installed is sealed by three O-rings 780, 782 and 784 which fit into the seal grooves 790 on the inner surface of the two-piece reservoir manifold 810. Also seen between the top cap side of the two-piece reservoir manifold 810 and the reservoir side of the two-piece reservoir manifold 812 are the two reservoir check valves 742 and 744 located in reservoir oil flow channels, an upper reservoir oil flow channel 746 and a lower reservoir oil flow channel 748 as seen in the compression cycle as shown in FIG. 65 and FIG. 66. A rectangular seal 814 lies between the two pieces of the two-pieces reservoir manifold and acts to seal in oil as it moves to and from the shock body to the reservoir.

Figure 70:
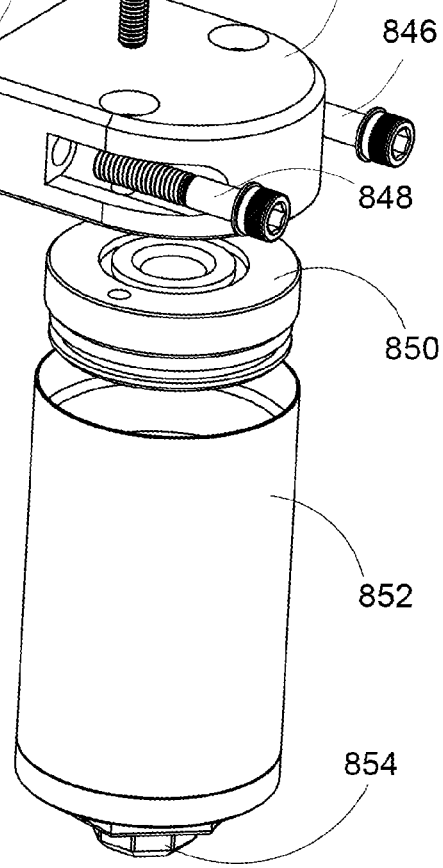
FIG. 70 depicts an exploded view of the reservoir manifold and reservoir illustrating the oil flow control valves located between the top cap reservoir manifold section seen in FIG. 69 and the reservoir manifold section which attaches to the reservoir itself through a reservoir adapter.

FIG. 70 depicts an exploded view of the reservoir side of the two-piece reservoir manifold 812 and the reservoir 852, illustrating the oil flow control check valves located between the top cap reservoir manifold section 810 seen in FIG. 69 and the reservoir manifold section 812 which attaches to the reservoir 852 itself through a reservoir adapter 850. The reservoir 852 and reservoir adapter 850 are secured to the reservoir side of the two-piece reservoir manifold 812 using retaining bolts 842 and 844. The reservoir side of the two-piece reservoir manifold 812 is secured to the top cap side of the two-piece reservoir manifold section 810 using retaining bolts 846 and 848. In addition to a reservoir adapter 850, the reservoir 852 also includes a reservoir valve cap 854. In this way, as constructed, the top cap side of the two-piece reservoir manifold section 810 and the reservoir side of the two-piece reservoir manifold 812 are in fluid communication as oil is allowed to flow, or is prevented from flowing, between them within oil flow channels 746 and 748 when the check valves 742 and 744 are in the open or closed position, respectively.

Externally Adjustable Internal Bypass Shock Absorber primary features will include as prominent design and operational features: a threaded outer shock body, a top cap assembly, an inner shock body housing bypass tubes, an upper bulkhead and lower bulkhead, bypass adjusters including plates, rods and seals, upper and lower bypass check valve assemblies, compression and rebound check valves, check valve retaining plates, adjuster rods, manual adjustment mechanisms, electronic adjustment mechanisms and a multi check valve in-out oil flow control piggyback reservoir which works in synergy with the bypass shock of the present invention to control oil flow and damping at high and low speeds and on rough or smooth terrain.

Other coilover shocks lack the ability to route the reservoir from the bottom of the shock, up and around the shock body to the top of the shock and out the reservoir. Conventional shocks must be routed through the top only, which makes compression forces and pressure act upon and negatively influence reservoir pressure. Routing oil from the bottom eliminates this negative effect and makes for a fully functional, no compromise bump zone, which can and will prevent a vehicle from bottoming out during compression. Shown here, in FIGS. 65-70 is an all-new check valve design that isolates and distributes oil during compression and rebound in the desired direction, giving the shock the best of both worlds.

In operation, the Externally Adjustable Internal Bypass Shock Absorber allows for individualized and simultaneous oil flow control of both multiple compression zones, rebound zones as well as free bleed, with position and velocity sensitivity through the use of bypass cavities, bypass adjusters, bypass tubes and bypass tube check valves. Additionally, the Externally Adjustable Internal Bypass Shock Absorber is that it provides external controlling of the internal oil flow by manual or electronic control of valves to regulate damping forces within the shock during a total spectrum of smooth or rough terrain. Furthermore, the Externally Adjustable Internal Bypass Shock Absorber is that as constructed it allows for separate high and low speed valving, which is missing in conventional internal bypass shock absorbers.

The advantages of the Externally Adjustable Internal Bypass Shock Absorber as described herein can be summarized as follows:

Every single shock adjustment is external. There are ZERO functions to adjust inside the shock absorber.

The Ability to externally adjust both high speed and low speed bypass zones as well as multiple compression and rebound zones.

Parallel tubes adjacent to inner body with twin corresponding check valves.

Ability to have one Check Valve for High and one for Low Speed simply by varying Spring Rate.

Redundant Bypass zones that function Separately for High Speed and Low Speed.

Check valves directing oil into reservoir from the bottom during compression and top in rebound.

High and Low Speed BYPASS zones function as sway control valves.

A cylindrical check valve has never been used for an INTERNAL bypass shock. Previous patented versions of this were kidney shaped and Fox is a Reed Valve (flapper).

By using high and low speed bypass ports, there is no need for a valved piston, therefore a solid piston is used. This is a huge advantage because when the piston enters the final compression stage, oil cannot go through, it has to go around. This can be adjusted to bring the shock to full hydraulic stop if desired (aka, bump stop).

Multiple smaller diameter tubes give more area for bypass zones and adjustability.

The Externally Adjustable Internal Bypass Shock Absorber 10 shown in the drawings and described in detail herein disclose arrangements of elements of particular construction and configuration for illustrating preferred embodiments of structure and method of operation of the present application. It is to be understood, however, that elements of different construction and configuration and other arrangements thereof, other than those illustrated and described may be employed for providing the Externally Adjustable Internal Bypass Shock Absorber 10 in accordance with the spirit of this disclosure, and such changes, alternations and modifications as would occur to those skilled in the art are considered to be within the scope of this design as broadly defined in the appended claims.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. For example, one portion of one of the embodiments described herein can be substituted for another portion in another embodiment described herein. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Further, the purpose of the foregoing abstract is to enable the U.S. Patent and Trademark Office, foreign patent offices worldwide and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

I claim:
1. An externally adjustable internal bypass shock absorber, comprising:

(a) a shock top cap assembly and an outer shock body having an inner shock body located therein, wherein said inner shock body includes a piston cavity that is filled with shock oil and houses a shock piston, and is smaller in diameter than said outer shock body thereby creating a space between said outer shock body and said inner shock body;

(b) an upper bulkhead connected to said outer shock body and said inner shock body at the upper portion of said outer shock body and inner shock body, wherein said upper bulkhead includes one or more oil flow orifices in fluid communication with said piston cavity;

(c) a lower bulkhead connected to said inner shock body at the lower portion of said inner shock body, wherein said lower bulkhead includes one or more oil flow orifices in fluid communication with said piston cavity;

(d) one or more bypass adjusters located externally on said shock top cap assembly wherein said one or more bypass adjusters located externally on said shock top cap assembly include linear adjuster assemblies and when actuated via manual or electronic means extend downwardly or upwardly to adjust the flow of oil;

(e) one or more bypass tubes connected to one or more bypass valves and one or more bypass check valves located within the space between said outer shock body and inner shock body wherein said bypass tubes are configured as parallel tubes in pairs adjacent to the inner body with twin corresponding bypass check valves in pairs wherein each of said bypass tubes are individually connected to bypass valves, and further wherein said bypass valves are individually adjustable for the purpose of adjusting the oil flow resistance within each bypass tube; and (f) a reservoir holding shock oil, in fluid communication with said upper bulkhead;

wherein said one or more bypass adjusters located externally on said shock top cap assembly allow for a coilover spring and are capable of being adjusted such that they restrict the flow of shock oil through said one or more bypass valves during shock piston compression and rebound cycles, thereby adjusting the action of the shock for differing conditions and speeds.

2. The externally adjustable internal bypass shock absorber according to claim 1, wherein said shock piston is a solid piston with no valves present within said shock piston and thereby can be adjusted to bring the shock to full hydraulic stop if desired.

3. The externally adjustable internal bypass shock absorber according to claim 1, wherein said one or more bypass adjusters located externally on said shock top cap assembly have threaded portions and when rotated via manual or electronic means extend downwardly or upwardly to adjust the flow of oil through said one or more bypass tubes by extending or compressing said valve to occlude, partially occlude or fully open.

4. The externally adjustable internal bypass shock absorber according to claim 1, wherein when said linear adjuster assemblies are actuated via manual or electronic means said linear adjuster assemblies extend downwardly or upwardly to adjust the flow of oil through said one or more bypass tubes by extending or compressing said valve to fully occlude, partially occlude or fully open said valve.

5. The externally adjustable internal bypass shock absorber according to claim 1, wherein said one or more bypass adjusters includes bypass adjusters configured for low-speed compression adjustment, low-speed rebound adjustment, free-bleed adjustment, high speed compression adjustment or high speed rebound adjustment.

6. The externally adjustable internal bypass shock absorber according to claim 5, wherein said bypass adjusters located externally on said shock top cap assembly are configured for compression zone adjustment, rebound zone adjustment, and free-bleed adjustment, and further wherein said bypass adjusters are configured to externally adjust both high speed and low speed bypass zones.

7. The externally adjustable internal bypass shock absorber according to claim 6, wherein said bypass adjusters configured for compression zone adjustment, rebound zone adjustment and free-bleed adjustment include high and low speed bypass adjustment zones which function as sway control valves, in the following way:

(a) said one or more bypass valves remain open when the shock shaft is at higher speeds; and (b) said one or more bypass valves close at lower shaft speeds not allowing oil to bypass the main shaft piston, thereby increasing compression and rebound damping, keeping the vehicle more stable, and bypass valves are adjustable, thereby allowing for adjustment of sway control at high and low shock piston speeds.

8. The externally adjustable internal bypass shock absorber according to claim 1, wherein said one or more bypass valves and bypass check valves are configured to have one check valve for high-speed adjustment and one for low-speed adjustment which is accomplished by varying the spring rate within each of said check valve springs.

9. The externally adjustable internal bypass shock absorber according to claim 1, wherein said one or more bypass check valves include cylindrical check valves.

10. The externally adjustable internal bypass shock absorber according to claim 1, wherein said inner shock body is configured with bypass tube accepting cavities that are longitudinally recessed to accept bypass tubes or valves.

11. The externally adjustable internal bypass shock absorber according to claim 1, wherein said reservoir includes one or more check valves which regulate the flow of shock oil into and out of said reservoir oppositely during compression and rebound of said shock piston by having the upper check valve close and the lower check valve open during compression while the upper check valve opens and the lower check valve closes during rebound.

12. A method for making an externally adjustable internal bypass shock absorber, comprising the steps of:

(a) providing a shock top cap assembly and an outer shock body having an inner shock body located therein, wherein said inner shock body includes a piston cavity that is filled with shock oil and houses a shock piston, and is smaller in diameter than said outer shock body thereby creating a space between said outer shock body and said inner shock body;

(b) providing an upper bulkhead connected to said outer shock body and said inner shock body at the upper portion of said outer shock body and inner shock body, wherein said upper bulkhead includes one or more oil flow orifices in fluid communication with said piston cavity;

(c) providing a lower bulkhead connected to said inner shock body at the lower portion of inner shock body, wherein said lower bulkhead includes one or more oil flow orifices in fluid communication with said piston cavity;

(d) providing one or more bypass adjusters located externally on said shock top cap assembly wherein said one or more bypass adjusters located externally on said shock top cap assembly include linear adjuster portions and when actuated via manual or electronic means extend downwardly or upwardly to adjust the flow of oil;

(e) providing one or more bypass tubes connected to one or more bypass valves and one or more bypass check valves located within the space between said outer shock body and inner shock body wherein said one or more bypass tubes are configured as parallel tubes in pairs adjacent to inner body with twin corresponding bypass check valves in pairs wherein each of said of bypass tubes are each individually connected to bypass valves, and further wherein said bypass valves are individually adjustable for the purpose of adjusting the oil flow resistance within each bypass tube; and (f) providing a reservoir holding shock oil, in fluid communication with said upper bulkhead;

wherein said one or more bypass adjusters located externally on said shock top cap assembly allow for a coil over spring and are capable of being adjusted such that they restrict the flow of shock oil through said one or more bypass valves during shock piston compression and rebound cycles, thereby adjusting the action of the shock for differing conditions and speeds.

13. The method of making an externally adjustable internal bypass shock absorber according to claim 12, wherein said shock piston is a solid piston with no valves present within said shock piston and thereby can be adjusted to bring the shock to full hydraulic stop if desired.

14. The method of making an externally adjustable internal bypass shock absorber according to claim 12, wherein said one or more bypass adjusters located externally on said shock top cap assembly have threaded portions and when rotated via manual or electronic means extend downwardly or upwardly to adjust the flow of oil through said one or more bypass tubes by extending or compressing said valve to occlude, partially occlude or fully open.

15. The method of making an externally adjustable internal bypass shock absorber according to claim 12, wherein when said linear adjuster assemblies are actuated via manual or electronic means said linear adjuster assemblies extend downwardly or upwardly to adjust the flow of oil through said one or more bypass tubes by extending or compressing said valve to fully occlude, partially occlude or fully open said valve.

16. The method of making an externally adjustable internal bypass shock absorber according to claim 12, wherein said one or more bypass adjusters includes bypass adjusters for low-speed compression adjustment, low-speed rebound adjustment, free-bleed adjustment, high speed compression adjustment or high speed rebound adjustment.

17. The method of making an externally adjustable internal bypass shock absorber according to claim 12, wherein said bypass adjusters for compression zone adjustment, rebound zone adjustment, free-bleed adjustment, are configured to externally adjust both high speed and low speed bypass zones.

18. The method of making an externally adjustable internal bypass shock absorber according to claim 17, wherein said bypass adjusters configured for compression zone adjustment, rebound zone adjustment and free-bleed adjustment include high and low speed bypass adjustment zones which function as sway control valves, in the following way:

(a) said one or more bypass valves remain open when the shock shaft is at higher speeds; and (b) said one or more bypass valves close at lower shaft speeds not allowing oil to bypass the main shaft piston, thereby increasing compression and rebound damping, keeping the vehicle more stable, and bypass valves are adjustable, thereby allowing for adjustment of sway control at high and low shock piston speeds.

19. The method of making an externally adjustable internal bypass shock absorber according to claim 12, wherein said one or more bypass valves and bypass check valves are configured to have one or more check valves for high-speed adjustment and one or more check valves for low-speed adjustment which is accomplished by varying the spring rate within each of said check valve springs.

20. The method of making an externally adjustable internal bypass shock absorber according to claim 12, wherein said one or more bypass check valves include cylindrical check valves.

21. The method of making an externally adjustable internal bypass shock absorber according to claim 12, wherein said inner shock body is configured with bypass tube accepting cavities that are longitudinally recessed to accept bypass tubes or valves.

22. The method of making an externally adjustable internal bypass shock absorber according to claim 12, wherein said reservoir includes an upper check valve and a lower check valve which regulate the flow of shock oil into and out of said reservoir oppositely during compression and rebound of said shock piston by having the upper check valve close and the lower check valve open during compression while the upper check valve opens and the lower check valve closes during rebound.

\* \* \* \* \*